3,301,418
CONVEYING APPARATUS
John V. Davis, Grosse Pointe Farms, Mich., assignor to
The Udylite Corporation, Warren, Mich., a corporation
of Delaware
Filed Oct. 6, 1964, Ser. No. 401,791
21 Claims. (Cl. 214—89)

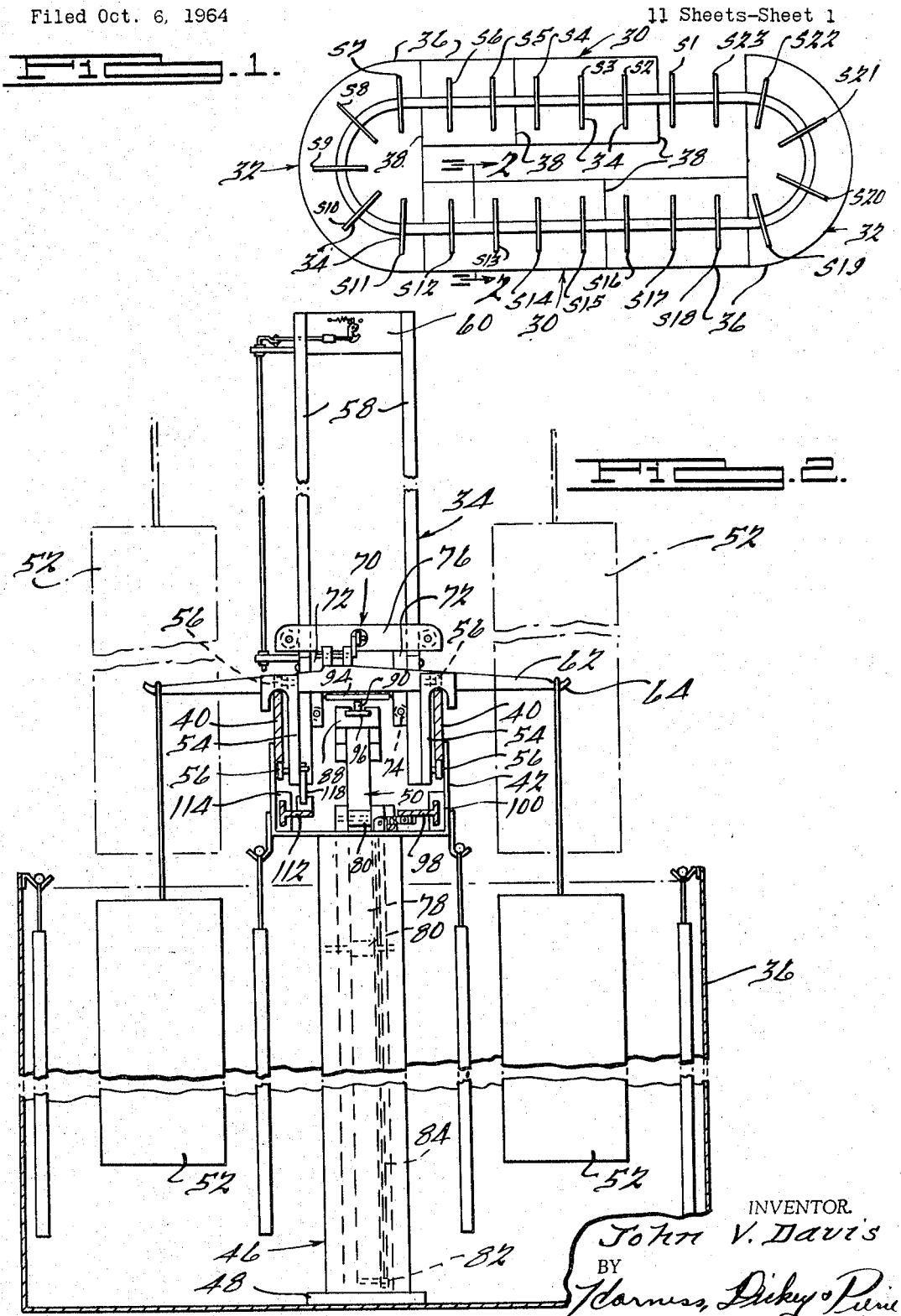

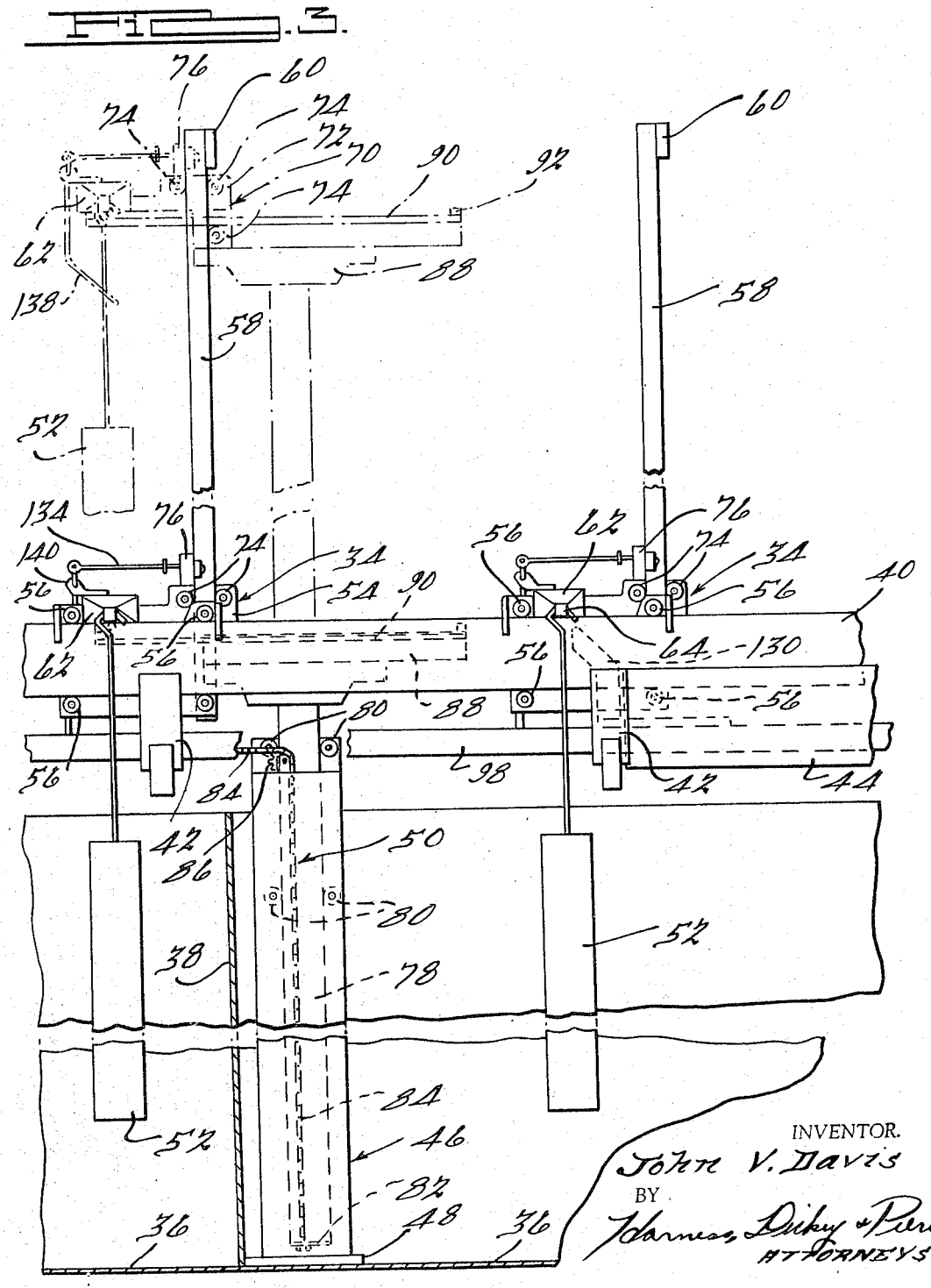

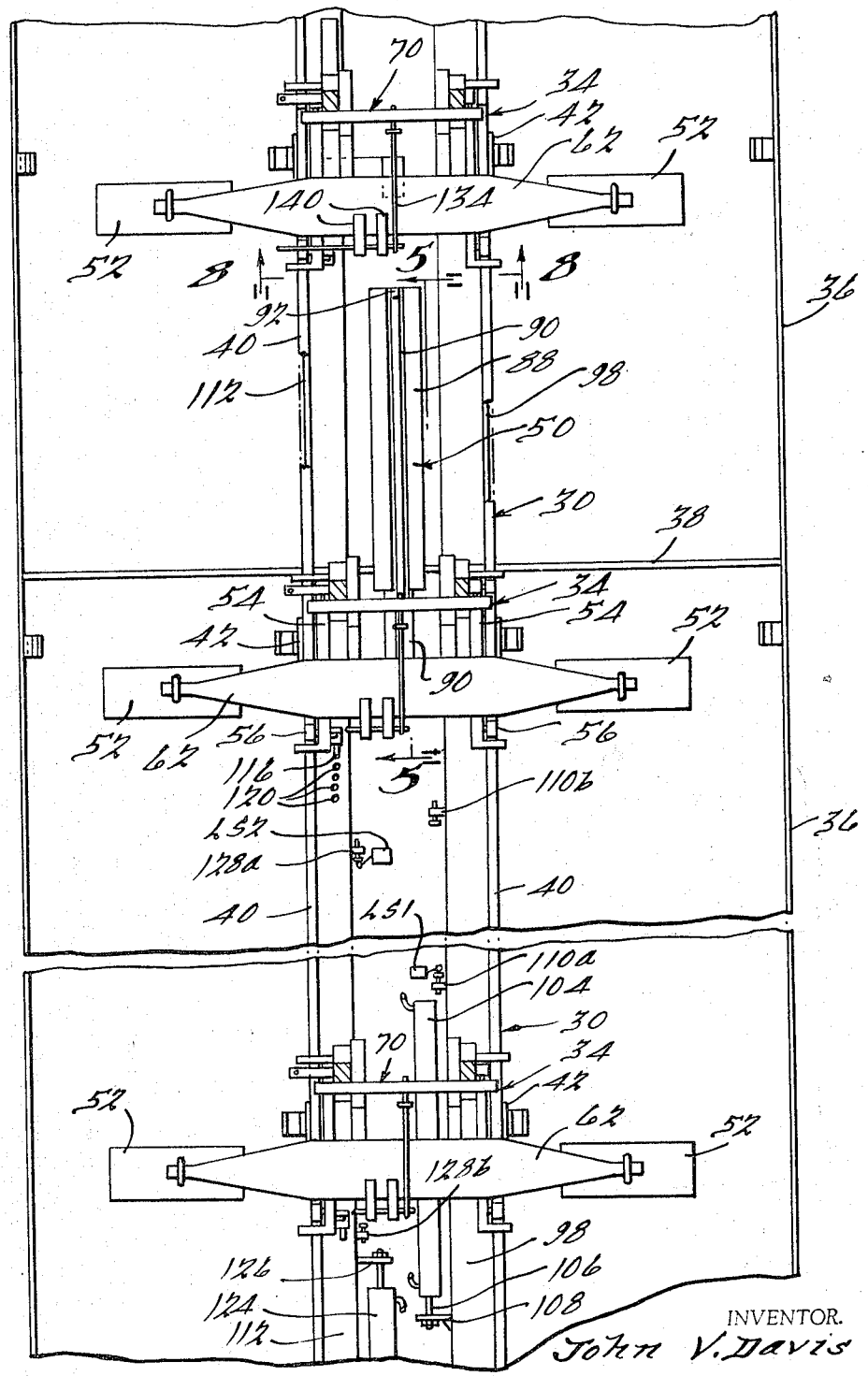

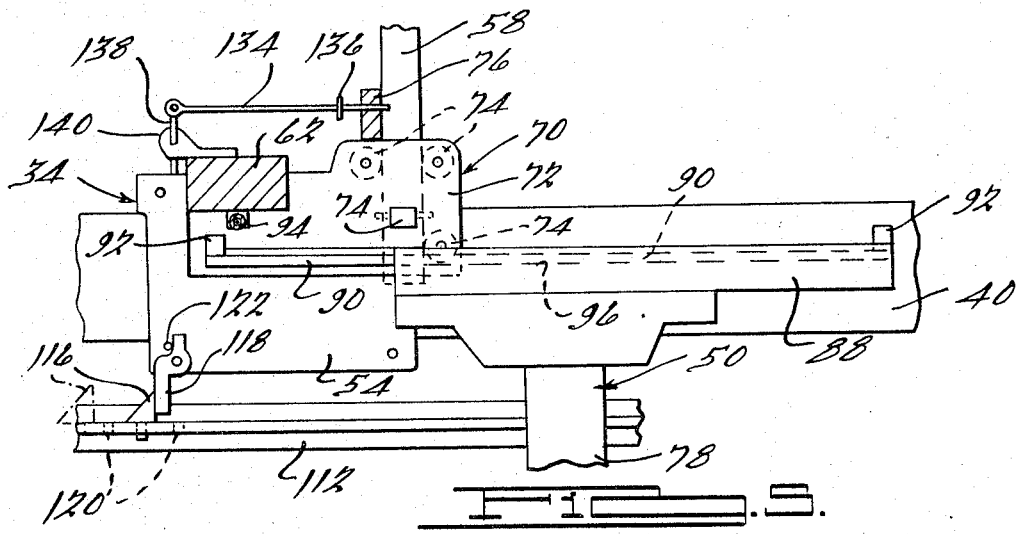
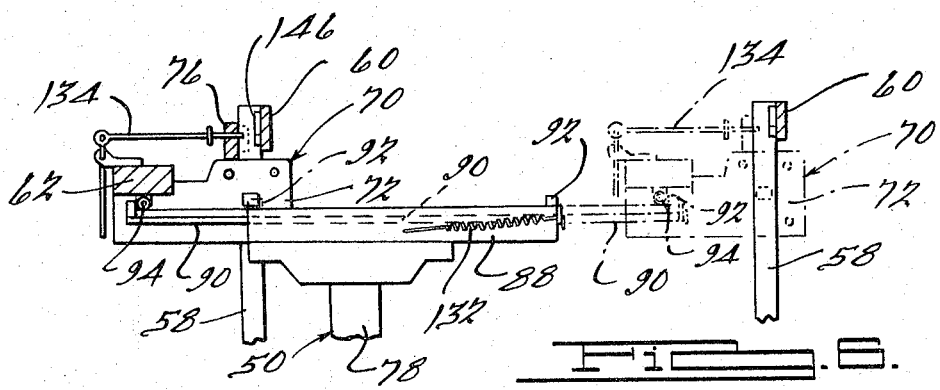
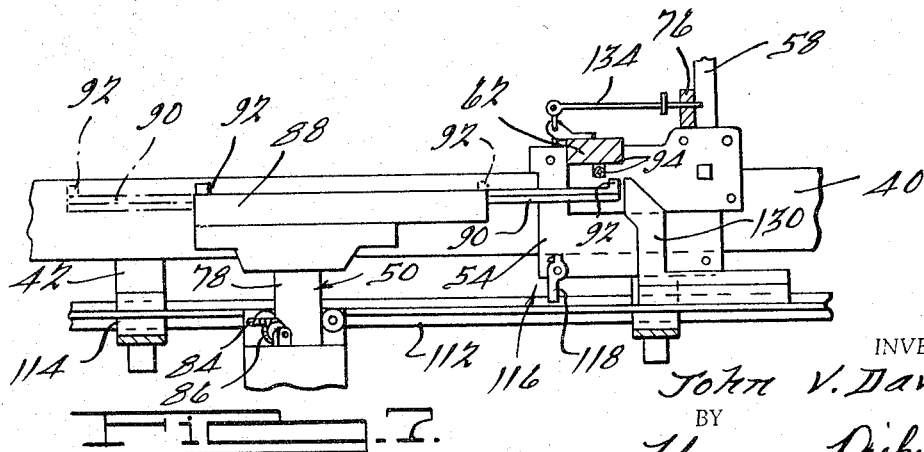

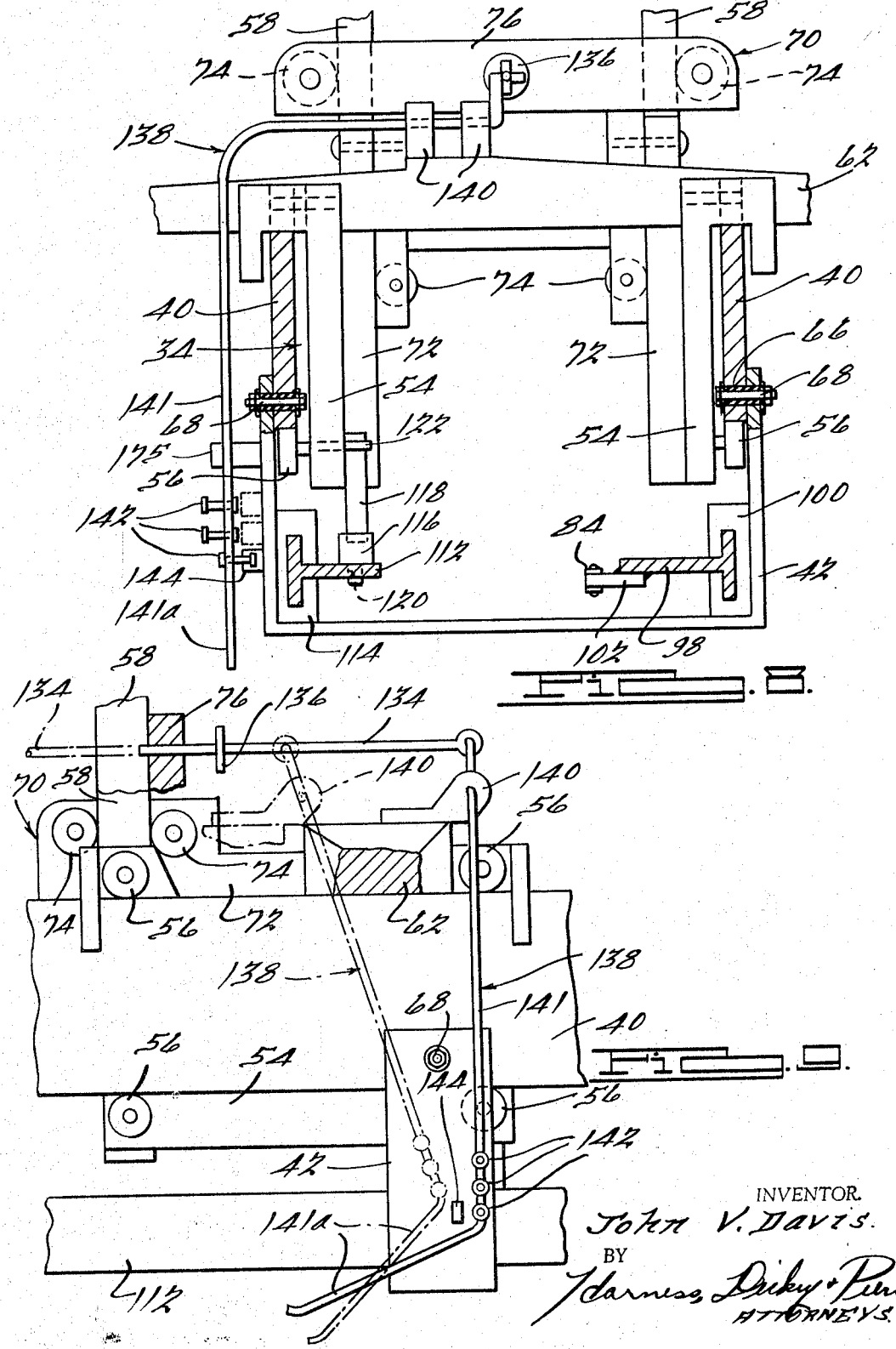

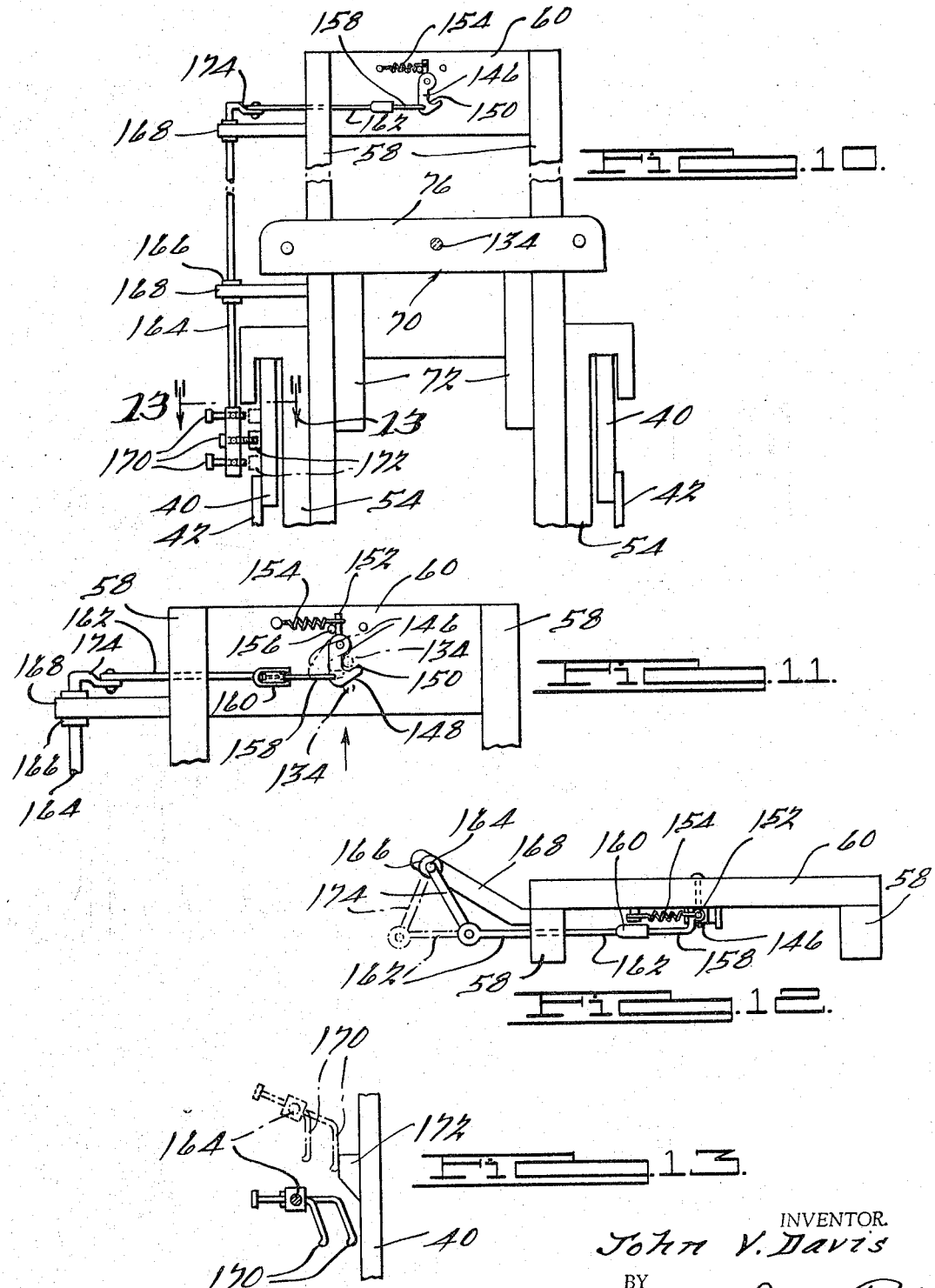

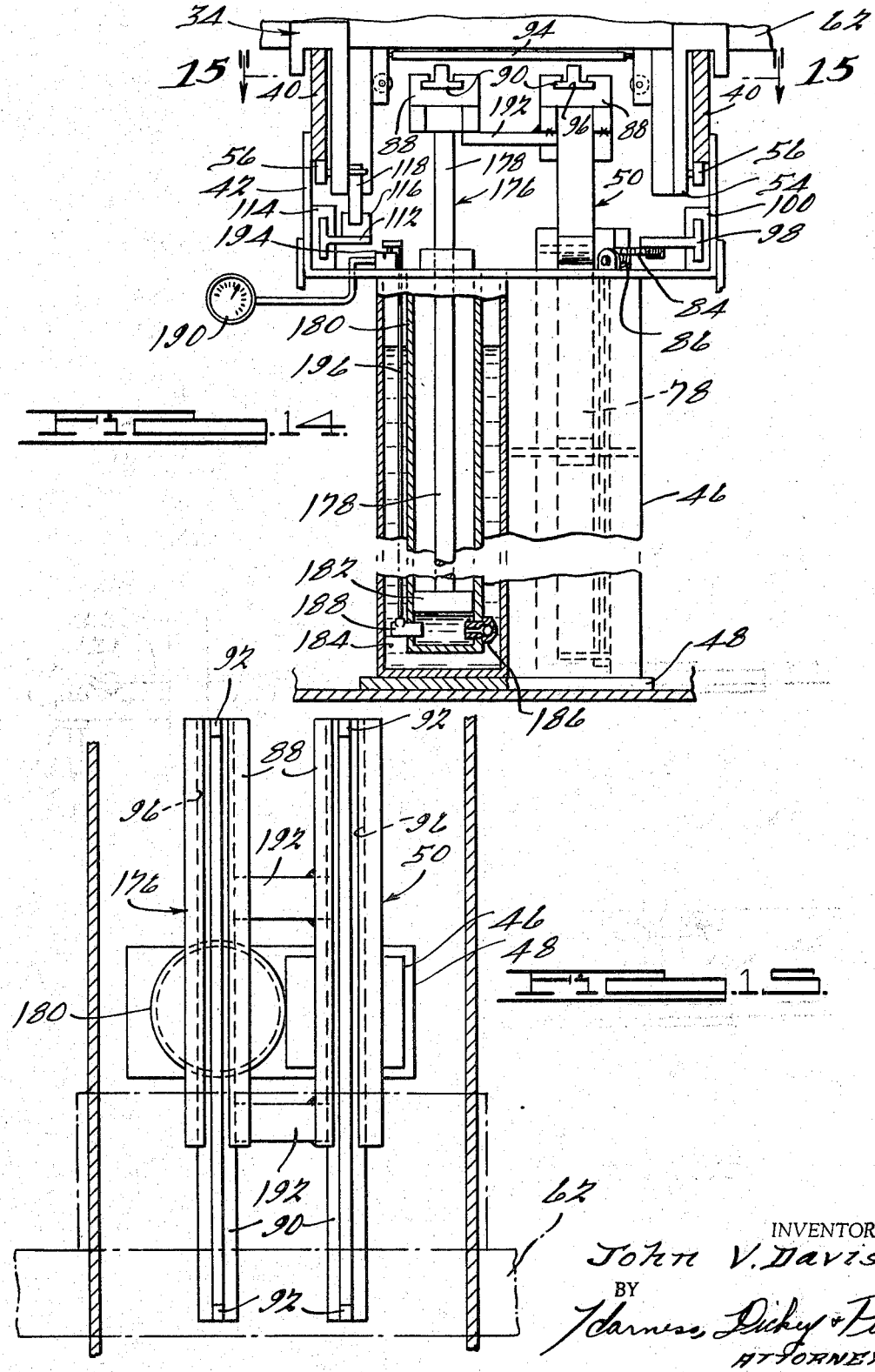

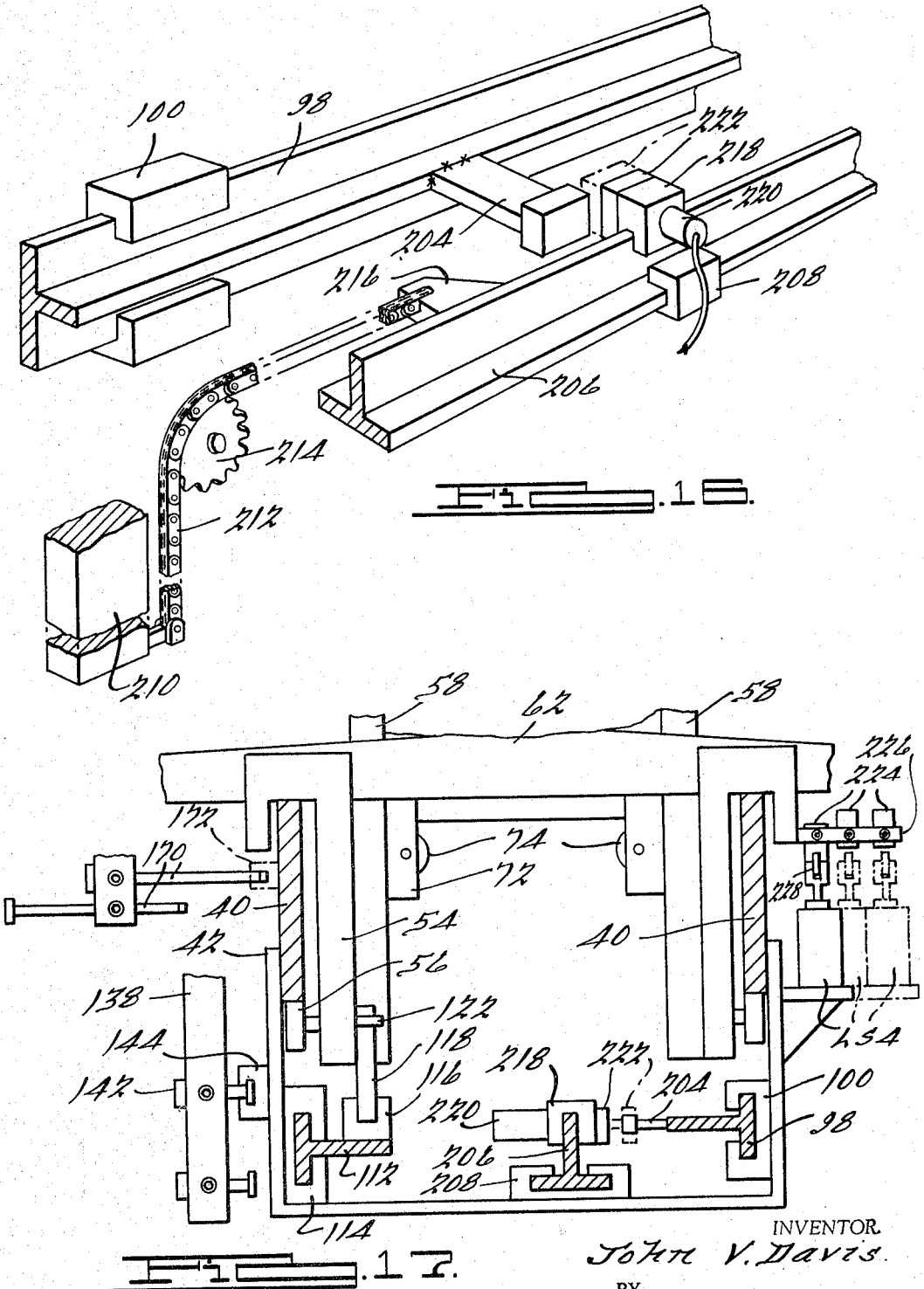

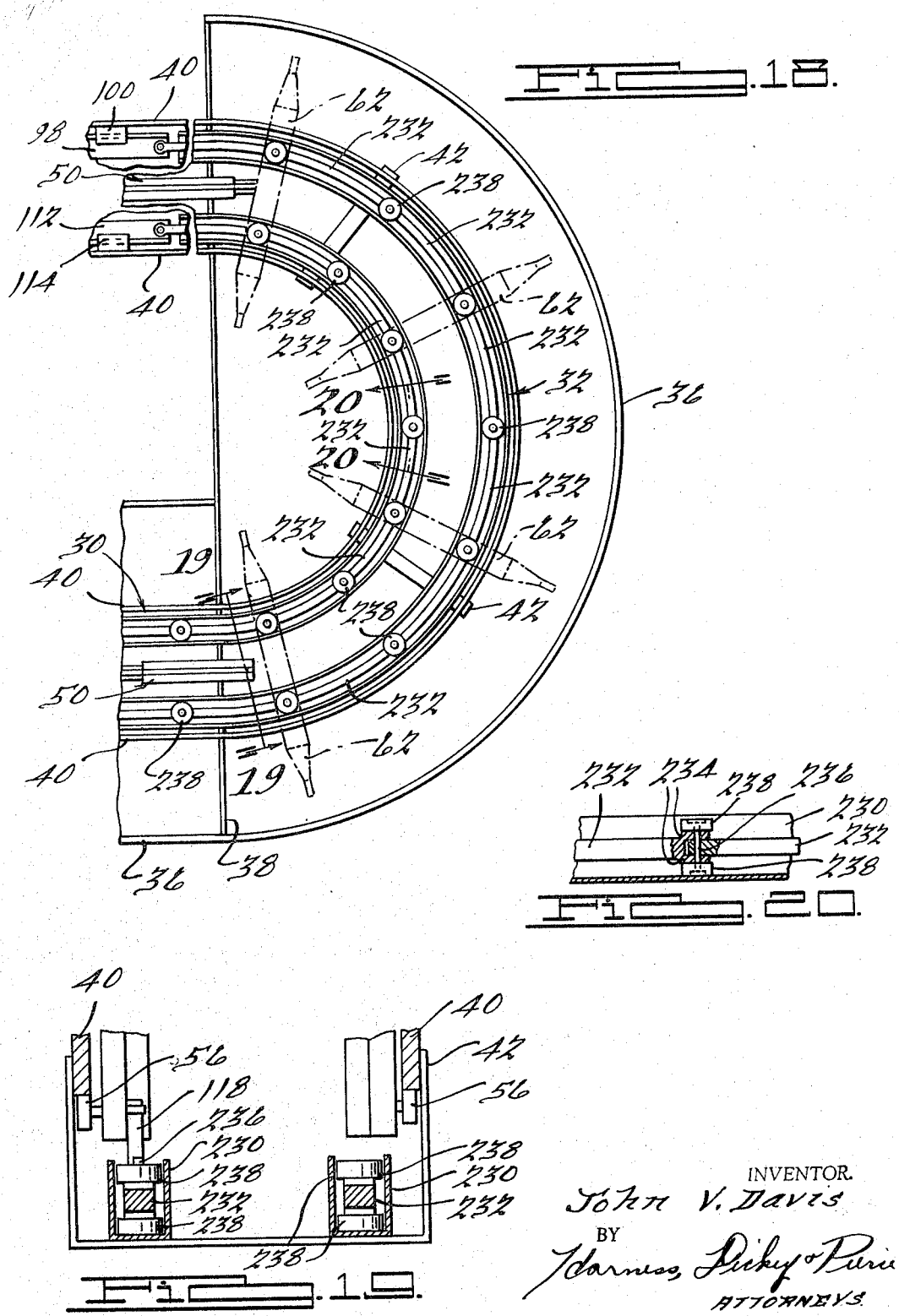

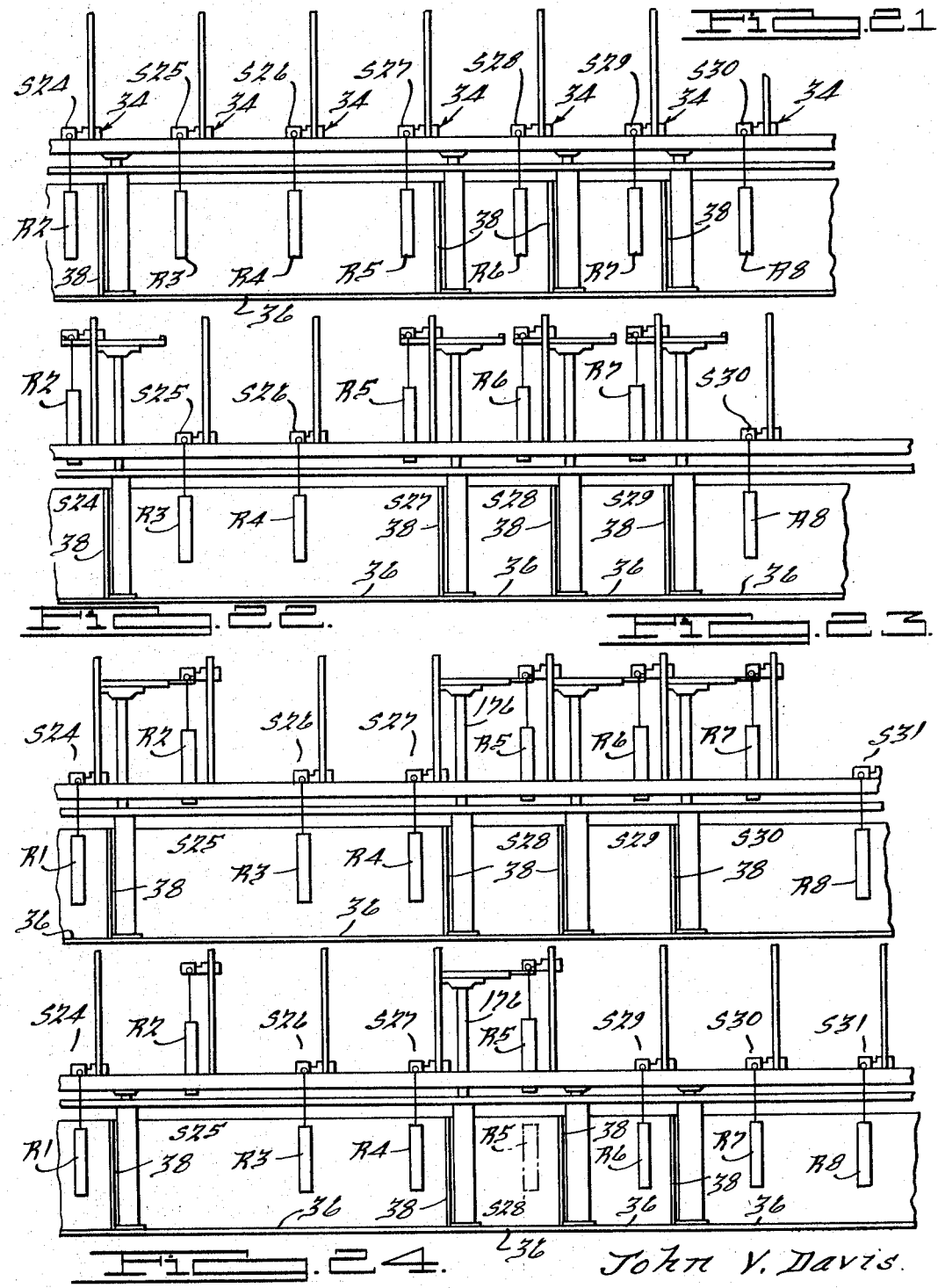

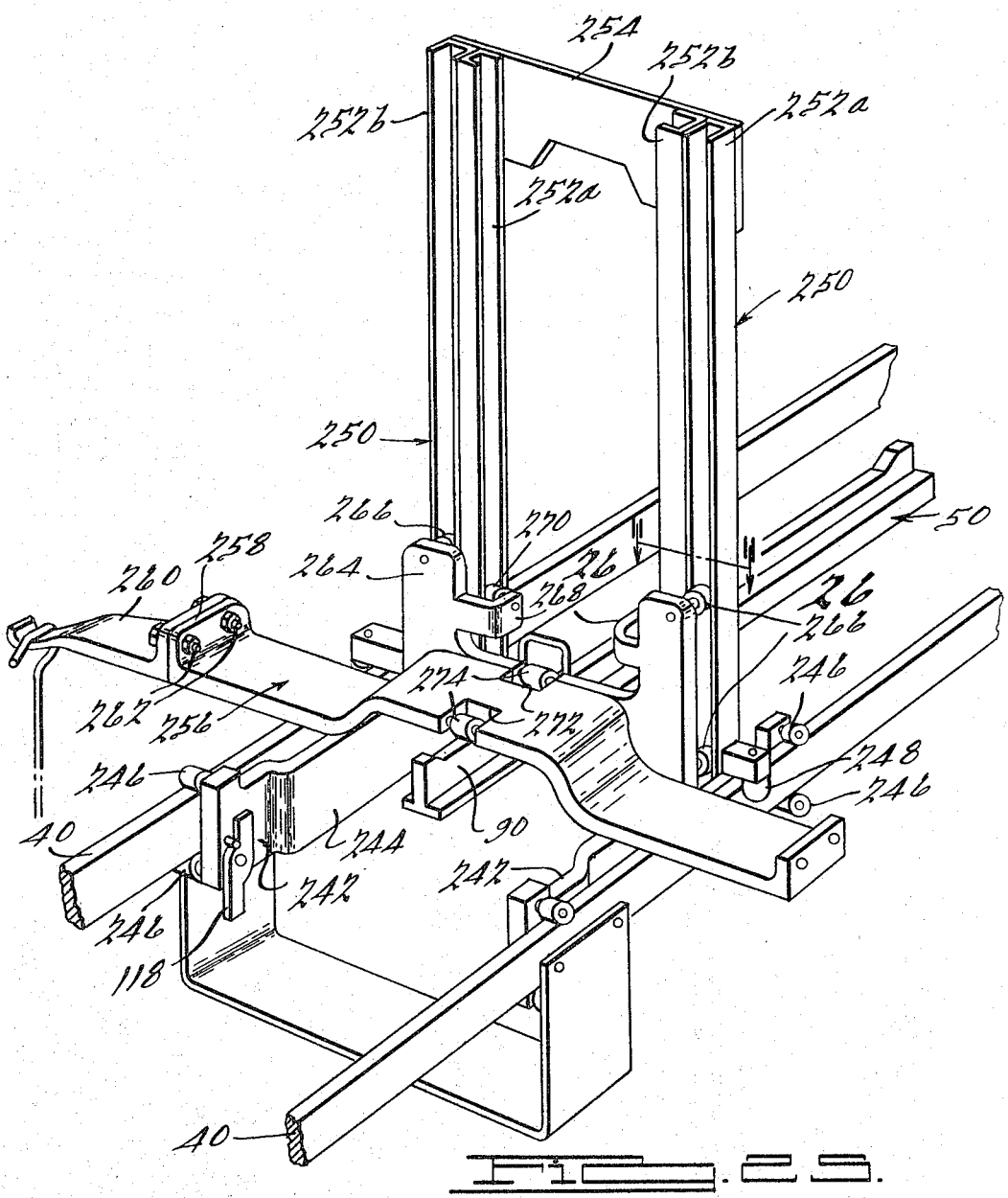
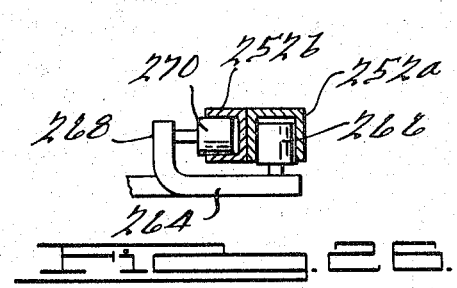

The present invention broadly relates to a conveying apparatus for transferring workpieces through a series of treating stations, and more particularly to an improved conveying apparatus which is adapted to be constructed in a series of standardized sections, enabling assembly thereof in any one of a variety of selected arrangements to provide the requisite treating sequence consistent with the treating operation to be performed. More specifically, the present invention comprises an improvement over conveying apparatuses of the type disclosed in United States Patent No. 3,100,453, granted August 13, 1963, for "Frameless Track Automatic Conveying Apparatus," and United States Patent No. 3,116,821, granted January 7, 1964, for "Elevating and Transfer Mechanism," which are assigned to the same assignee as the present invention.

A variety of different types of conveying apparatuses are in widespread commercial use for automatically and sequentially transferring a plurality of workpieces through a prescribed treating operation, such as an electrochemical, chemical, or electroplating operation, or the like. Conventionally, such conveying machines are custom designed to comply with a specific plant installation and operating sequence, requiring a substantial expenditure in design and development engineering effort to assure that the appropriate operating function and machine durability are attained. Conveying apparatuses of the type disclosed in the aforementioned United States patents provide significant advantages over the types heretofore known in that they are adaptable to sectionalized construction comprising a plurality of standard sections which are readily assemblable in a preselected order so as to provide the desired machine arrangement and the requisite treating cycle. A sectionalized construction of this type substantially reduces the cost and time of design and development of a particular machine, and moreover dispenses with the necessity of preliminarily assembling the machine at the factory and subsequently disassembling the machine for shipment and reassembly thereof at the plant site. Machines of this general type moreover provide for increased flexibility and versatility in modifying the basic machine layout by substituting other standardized sections therefore as may be necessitated from time to time to provide a modification in its specific arrangement or operating sequence.

The conveying apparatus comprising the present invention is also adaptable to a sectionalized construction, providing therewith the advantages as embodied in the machines disclosed in the aforementioned United States patents, and further incorporates therein improvements in the work carrier design and in the means for effecting elevation of the work racks at selected points along the treating cycle to enable transfer of the work racks above the partitions separating adjoining treating receptacles as well as providing for preselected variations in the basic treating cycle such as a skip operation, a delay dip operation, and an early pickup operation, as may be desired.

It is, accordingly, a principal object of the present invention to provide an improved conveying apparatus which provides for further simplification in construction and operation and an increase in its flexibility and versatility in comparison to conveying apparatuses of the various types heretofore known.

Another object of the present invention is to provide an improved conveying apparatus which is adaptable for fabrication in a series of standardized sections which can be mounted directly above and supported on a series of aligned treating receptacles, avoiding thereby the necessity of employing a cumbersome and heavy space-consuming framework and providing thereby a more compact and lightweight machine.

Still another object of the present invention is to provide an improved conveying apparatus which is completely devoid of any overlying superstructure, permitting the use of deeper treating receptacles and longer work racks with a corresponding increase in machine capacity for a given overhead clearance and further facilitating access to the operative components of the machine.

A further object of this invention is to provide an improved conveying apparatus which is readily adaptable for completely automatic operation and wherein preselected ones of the work carriers can be programmed to undergo selected variations in the basic treating sequence, still further enhancing the versatility of the machine.

A still further object of the present invention is to provide an improved conveying apparatus which is of simple design, of durable operation, and of economical manufacture.

The foregoing and other objects and advantages of the present invention are achieved by providing a conveying machine comprising a series of assemblable standardized sections, including straight sections and arcuate sections which are readily connectible to form a continuous track extending above an aligned series of treating stations. A plurality of work carriers are movably mounted at spaced intervals on the track and are intermittently advanced therealong by a transfer mechanism disposed longitudinally of the path of travel of the carriers. Each carrier includes upright guide means thereon for movably guiding and vertically supporting a work carrier arm from which workpieces are suspended above the treating stations.

Lift mechanisms are disposed below the tracks and are operable for effecting an ascending and descending movement of the work carrier arms and the work racks suspended therefrom in order to enable transfer of the work racks above partitions separating adjoining treating receptacles or other obstructions in the path of travel of the work racks. Suitable selector means can be incorporated on the machine which are interengageable by coacting means on each work carrier for selectively controlling certain ones of the lift mechanisms, effecting an early pickup of the work racks from an intermediate station of a multiple station treating receptacle. Additionally, selector means can be provided whereby selected ones of the work carrier arms are retained in an elevated position during a preselected travel thereof through the treating stations, providing therewith a skip operation. A delay dip mechanism is also provided wherein a work carrier arm is retained in a raised position for a preselected time period after the remaining work carrier arms are lowered, so as to achieve a preselected reduction in the total treating time of the workpieces on the work racks suspended therefrom.

Other objects and advantages of the present invention will become apparent from the following detailed description taken in conjunction with the accompanying drawings, wherein:

FIGURE 1 is a schematic plan view of an assembled sectionalized conveying machine arranged in a continuous loop configuration characteristic of a machine of the return type.

FIGURE 2 is a transverse vertical sectional view through one side of the machine shown in FIGURE 1 and taken along the line 2—2 thereof;

FIGURE 3 is a fragmentary side elevational view partly in section of the machine as illustrated in FIGURE 2;

FIGURE 4 is a fragmentary plan view of the straight machine section illustrated in FIGURES 2 and 3;

FIGURE 5 is a fragmentary vertical sectional view of the lift mechanism and work carrier shown in FIGURE 4 and taken on the line 5—5 thereof;

FIGURE 6 is a fragmentary vertical sectional view similar to that of FIGURE 5, but with the lift mechanism in the raised position;

FIGURE 7 is a fragmentary vertical sectional view similar to that shown in FIGURES 5 and 6, with the lift mechanism and work carrier in the lowered position at the completion of a transfer movement;

FIGURE 8 is a fragmentary vertical sectional view through the conveying machine as taken along the line 8—8 of FIGURE 4 and illustrating the cam selector mechanism for selectively providing a skip operation of the workpieces;

FIGURE 9 is a fragmentary side elevational view of the cam selector mechanism illustrated in FIGURE 8;

FIGURE 10 is a fragmentary transverse sectional view through the machine and illustrating the unlatching mechanism on the work carrier guide means enabling a lowering of a work carrier arm at the completion of a skip operation;

FIGURE 11 is a magnified end elevational view of the upper portion of the work carrier guide means illustrating, in particular, the linkage means for actuating the latch mechanism;

FIGURE 12 is a fragmentary plan view of the upper end of the guide means of the work carrier and the latch mechanism linkage illustrated in FIGURE 11;

FIGURE 13 is a fragmentary horizontal sectional view of the cam actuating mechanism of the linkage illustrated in FIGURES 10–12 and taken along the line 13—13 of FIGURE 10;

FIGURE 14 is a fragmentary transverse vertical sectional view through the machine, illustrating the embodiment of a delayed dip mechanism at a treating station;

FIGURE 15 is a fragmentary horizontal sectional view of the delay dip mechanism illustrated in FIGURE 14 and taken along the line 15—15 thereof;

FIGURE 16 is a fragmentary perspective view of an engaging mechanism operable to selectively engage a lift mechanism, effecting elevation of a work carrier from a lowered position to a raised position in accordance with a preselected early pickup operation;

FIGURE 17 is a transverse vertical sectional view of a machine section embodying the selective lift mechanism as illustrated schematically in FIGURE 16;

FIGURE 18 is a fragmentary plan view of an arcuate turn-around section of the conveying machine;

FIGURE 19 is a transverse sectional view through the arcuate turn-around section shown in FIGURE 18 and taken along the line 19—19 thereof;

FIGURE 20 is a fragmentary enlarged side elevational view partly in section illustrating the interconnection between the links extending around the arcuate turn-around section;

FIGURES 21 through 24 are fragmentary schematic side elevation views of a typical conveying machine illustrating the operating sequence thereof;

FIGURE 25 is a fragmentary perspective view of an alternative satisfactory construction of the work carrier and vertical guide means thereon; and FIGURE 26 is a horizontal fragmentary sectional view through one of the vertical guide members shown in FIGURE 25 and taken along the line 26—26 thereof.

Referring now in detail to the drawings, and as may be best seen in FIGURES 1–4, a conveying machine constructed in accordance with the preferred embodiments of the present invention is comprised of a series of straight sections forming a pair of substantially parallel extending straight side portions 30 of the machine which are connected at opposite ends thereof by arcuate turn-around sections 32. In the exemplary arrangement illustrated in FIGURE 1, the straight side sections 30 and arcuate turn-around sections 32 form a continuous loop, providing therewith a machine of the so-called return type in which the workpieces supported on work carriers indicated at 34 above an aligned series of treating receptacles 36 in the specific arrangement illustrated. The workpieces are loaded on the work carriers 34 at a load station such as the load station S1 and are thereafter conveyed through the treating stations S2 through S22 and are unloaded from the work carriers at the unload station indicated at S23. Lift mechanisms, as subsequently described, are provided at intervals along the several machine sections to effect a lifting of the work racks in order that they can be transferred above the partitions indicated at 38, separating adjoining treating receptacles. While the conveying apparatus illustrated in FIGURE 1 is of the turn-around type, it will be understood that alternative satisfactory arrangements of the several conveying machine sections can be achieved to provide for a machine of the so-called straight-through or straight-line type in which work pieces are loaded at one end of the machine and are transferred through a series of treating stations and are subsequently unloaded at the opposite end thereof. Alternatively, the machine sections can be arranged in any one of a variety of configurations including L-shapes, V-shapes, or the like, consistent with the particular plant layout and the treating sequence to be achieved in order to provide coordination with other processing machines and operations, achieving optimum efficiency and utilization of plant space and equipment.

The conveying machine sections, as may be best seen in FIGURES 2–4, comprise a pair of spaced tracks 40 which extend in spaced substantially parallel relationship, and on which the work carriers 34 are movably mounted. The tracks 40 are securely fastened to the upper inner ends of U-shape frame members 42 which are disposed in longitudinally spaced increments to provide appropriate rigidification of the machine sections. Suitable U-shaped sheet metal drip pans, such as the drip pan fragmentarily shown and indicated at 44 in FIGURE 3, extend between the U-shaped frame members 42 and serve to catch any foreign matter falling from the work carriers, preventing thereby contamination of any treating solutions over which the machine sections extend.

The support of the tracks 40 in an appropriate horizontal position is achieved by columns 46 provided with base pads 48 which are disposed in supporting relationship against either the base of a treating receptacle or on a platform or floor on which the treating receptacles are supported. In the exemplary embodiment illustrated in FIGURES 2–4, the columns 46 are directly immersed in the treating solution and, accordingly, are of a liquid-tight construction. In such case, the columns are preferably provided with a suitable coating such as a polyvinyl chloride coating on the exterior surfaces thereof to prevent corrosive attack by the acidic or alkaline treating solution. It is also contemplated that suitable wells can be provided between adjoining tanks in which the columns 46 are positioned, avoiding thereby direct exposure thereof to the liquid treating solutions. Alternatively, adjoining treating receptacles can be spaced at an interval sufficient to accommodate the column 46, and in such arrangement the columns are supported directly by either a platform or the floor on which the receptacles are mounted. In either case, the columns 46 are formed with an elongated cavity therein in which a lift mechanism 50 is mounted and vertically reciprocable therein for effecting a lifting of work racks such as the racks indicated at 52 in FIGURE 3 from a lowered position as illustrated in solid lines to a raised position as indicated in phantom. In the raised position, the lower ends of the work racks 52 are positioned in clearance relationship above a tank partition 38 separating adjoining treating receptacles 36.

The work carriers 34 are movably mounted on the tracks 40 and, since each carrier is substantially identical, a detailed description of one work carrier will suffice. As shown in FIGURES 2–4, the work carrier 34 comprises a pair of spaced side members 54 disposed adjacent to the inner side surfaces of the tracks 40 and are provided with rollers 56 at the forward and rearward end portions thereof which are disposed in rolling engagement with the upper and lower edges of the tracks 40. A pair of upright guide members indicated at 58 are affixed to the side members 54 at their lower ends and extend upwardly in spaced substantially parallel relationship. A cross member 60 is affixed to the upper ends of the guide members 58, providing for further rigidification thereof.

A work carrier arm 62 extends transversely of the tracks 40 and is formed with suitable engaging means such as hooks 64 at the opposite ends thereof for removably supporting the work racks 52 which are suspended therefrom. The side members 54 of the carrier are suitably recessed along their mid portion such that when the work carrier arm is in its lowered position it is resting in contact with upper surfaces of the tracks 40. In accordance with this arrangement, at those stations where an electroplating or electrochemical operation is to be performed, appropriate sections of the tracks 40 are electrified by any one of a variety of techniques well known in the art, whereupon the work carrier arms and the work racks suspended therefrom are also electrified. In such cases where the track sections 40 are electrified, appropriate insulation is provided between the track sections and the U-shaped frame members 42 such as, for example, the arrangement illustrated in FIGURE 8. As indicated in FIGURE 8, a spool of insulating material indicated at 66 is provided which serves to electrically insulate a securing bolt indicated at 68 from the track section 40. In addition, the rollers 56 of the work carrier 34 may suitably be provided with bearings of an insulating material to prevent electrification of other portions of the work carrier, if desired, when mounted on electrified track sections.

The work carrier arm 62, as may be best seen in FIGURES 2 and 5, is supported on a carriage indicated at 70, which consists of a pair of spaced side members 72 on which rollers 74 are mounted for engaging opposite side edges and the face surface of the guide members 58 during ascending and descending movement of the carriage. The work carrier arm 62 is preferably mounted on the side members 72 in a manner so that the carriage 70 is electrically insulated therefrom. A cross member 76 is affixed to and extends laterally between the two side members 72, effecting further rigidification of the carriage. It will be apparent from the foregoing description of the work carrier as illustrated in FIGURES 2–4 that the work carrier arm is guided for horizontal movement by the tracks 40 and for vertical movement by the vertical guide members 58 on which the carriage 70 is movably mounted.

Movement of the work carrier arm to and from the lowered position, as shown in solid lines in FIGURE 3 to the raised position as shown in phantom, is achieved by the lift mechanism 50 which is mounted for reciprocable movement in a substantially vertical direction in each column 46. As may be best seen in FIGURES 2–4, the lift mechanism comprises a column or slide member 78 which is slidably supported and guidably mounted within the column 46. Rollers 80 are mounted within the column 46 and are disposed in rolling contact with the slide member 78 for minimizing the friction during the vertical movement of the lift mechanism. A bracket 82 is affixed to the lower end portion of the slide member 78 to which a suitable flexible element such as a chain 84 is connected and which extends upwardly therefrom and is trained over a suitable sprocket 86 rotatably mounted on the frame at a position spaced below the tracks 40. To the upper end portion of the slide member 78 an elongated member or lift pad 88 is securely fastened which is disposed below the level of the work carrier arm 62 when in the fully lowered position. The lift pad 88 extends longitudinally between the tracks 40 and incorporates a supporting member or slide 90 in the upper face thereof which is reciprocable to and from a retracted position as shown in FIGURE 6 to a projected position as shown in phantom. The lift pad 88 is of a length such that the rearward portion or left side as viewed in FIGURE 3 is disposed in vertical clearance relationship relative to a work carrier positioned immediately therebehind, enabling unobstructed vertical movement of the lift pad from a fully raised position to a lowered position. The slide 90 is formed with a raised projection 92 at opposite ends thereof, the upper portions of which are disposed in vertical clearance relationship relative to the work carrier arm when the lift mechanism is in the fully lowered position, as may be best seen in FIGURE 5. The slide 90, when in the fully retracted position as shown in FIGURE 5, is positioned with the rearward end portion thereof in engaging alignment below the lift arm which preferably is provided with a suitable engaging roller 94 under the lower surface thereof that is adapted to be disposed in rolling bearing relationship on the slide when the lift arm is supported thereby. When in the retracted position, the forward end portion of the slide 90 is disposed in vertical clearance relationship relative to the work-supporting arm of the work carrier positioned at the next adjacent treating station.

Longitudinal sliding movement of the slide 90 relative to the pad 88 is provided by the inverted T-shaped slot 96 extending longitudinally along the upper surface of the lift pad, as may be best seen in FIGURE 2. Movement of the lift pad from the fully retracted position to the fully advanced position is achieved by the coaction of the engaging roller 94 with the forwardmost projection 92 on the slide in response to the advancing movement of the work carrier when the arm is in an elevated position. Retraction of the slide from the fully projected or advanced position to the fully retracted position is achieved in response to the return travel of the transfer mechanism or by suitable urging means, as will subsequently be described.

In accordance with a preferred construction of the present invention, movement of each elevating or lift mechanism is achieved in unison by employing a lift bar 98 which is of a T-shaped cross section and extends longitudinally against the straight machine sections 30. As may be best seen in FIGURES 2, 4, and 8, the lift bar is reciprocably mounted for longitudinal sliding movement in shoes 100 affixed at spaced intervals to the U-shaped frame members 42 of the machine section. A suitable bracket, such as a bracket 102, is securely fastened at spaced intervals to the horizontal projecting web of the lift bar to the end of which a link of the lift chain 84 is securely fastened. Accordingly, longitudinal reciprocation of the lift bar effects vertical reciprocation of each of the slide members 78 of each lift mechanism, effecting elevation of the work carrier arms of those work carriers positioned adjacent to a partition between adjoining treating receptacles.

Longitudinal reciprocation of the lift bar 98, as may be best seen in FIGURE 4, is achieved by a double-acting fluid-actuated lift cylinder 104 which is mounted in the machine frame between the tracks 40. The closed end of the cylinder 104 is affixed to the U-shaped frame members and a piston rod 106 thereof is attached to an ear 108 affixed to and projecting from the horizontal web of the lift bar 98. Accordingly, by alternatively passing a pressurized fluid into the blank end and into the rod end of the lift cylinder 104, appropriate reciprocation of the lift bar and ascending and descending movement of the individual lift mechanisms can be achieved in unison.

The length of the reciprocating travel of the lift bar may be suitably controlled by means of a lift limit switch indicated at LS1 in FIGURE 4, which is adapted to be tripped by actuators 110a, 110b mounted at a preselected longitudinally spaced interval to the projecting horizontal web of the lift bar. In the specific position shown in FIGURE 4, the lift bar is illustrated in the fully retracted position wherein actuator 110a has tripped the limit switch, signalling the central control circuit that the lift mechanisms have attained the fully lowered position and through appropriate valving effects a stoppage of the flow of pressurized fluid into the rod end of the lift cylinder. In accordance with the machine cycle, when it is time for effecting a lifting of the several work carrier arms, appropriate valves in the hydraulic circuit are opened, whereupon hydraulic fluid is directed into the blank end of the cylinder, effecting advancement of the lift bar and a corresponding lifting movement of each of the lift mechanisms and the work carrier arms supported thereby. The fully raised position of the individual lift mechanisms is signaled in response to the tripping of the lift limit switch LS1 by the actuator 110b which, through the central control circuit, stops the flow of pressurized fluid into the rod end of the lift cylinder.

The intermittent transfer of the work carriers and the work racks supported on the work-supporting arms is achieved by a reciprocable transfer mechanism, as best seen in FIGURES 4 and 8, comprising a pusher bar 112 which is of a T-shaped cross section and is slidably mounted for reciprocating movement and guidably supported by means of a series of guide shoes 114 disposed at longitudinally spaced increments along the straight machine section on the side opposite to the lift bar 98. A series of longitudinally spaced engaging dogs 116 are affixed to the horizontally extending web of the pusher bar 112 and are adapted to engage pivotally mounted pushers 118, as may be best seen in FIGURES 5 and 8, each of which is mounted, respectively, on one side member 54 of each work carrier 34. The engaging dogs 116 are preferably removably mounted in order that they can be positioned at any desired spacing interval along the web of the pusher bar 112. For this reason, the web of the pusher bar 112 is preferably provided with a plurality of apertures indicated at 120 for varying the spacing interval of the engaging dogs as desired.

Variations in the spacing interval of the engaging dogs for any given advancing movement of the pusher bar, wherein such spacing interval does not exceed the total reciprocating travel in one direction of the bar, provides for variations in the advancing movement of the carriers and corresponding variations in the rack spacing thereof as may be desired in certain treating stations. For example, referring to FIGURE 5, by adjustably positioning the engaging dog 116 from the position shown in solid lines to a position as shown in phantom, a portion of the total advancing movement of the pusher bar will consist of a lost motion until the engaging dog contacts the pusher 118 on the carrier, after which advancement of the carrier will occur for the balance of the advancing stroke of the pusher bar. Accordingly, changes in the spacing of the engaging dog to provide for greater or lesser degrees of lost motion of the engaging dog relative to the pusher 118 result in variations in the total advancement of the particular carrier by that particular engaging dog.

The pusher 118, as shown in FIGURE 5, is mounted so as to be pivotable in a clockwise direction to permit retraction of the engaging dog during the retracting movement of the pusher bar to a position behind the pusher, preparatory to the next advancing movement. Pivoting of the pusher 118 during the advancing movement of the pusher bar is prevented by a suitable stop indicated at 122 which engages the upper portion of the pusher, preventing pivoting movement thereof when engaged by the engaging dog during the advancing travel of the pusher bar.

Reciprocation of the pusher bar to and from the retracted position, as shown in solid lines in FIGURE 4, to an advanced position may suitably be achieved by a double-acting fluid-actuated transfer cylinder 124 mounted on the machine frame below the tracks 40. The rod end of the transfer cylinder is connected to a suitable ear 126 affixed to and projecting from the horizontal web of the pusher bar 112. A suitable transfer limit switch, indicated at LS2 in FIGURE 4, is employed for signalling the central control circuit when the pusher bar has attained the fully projected and the fully retracted position. For this purpose actuators 128a, 128b are affixed to the horizontal web of the pusher bar at an appropriate longitudinally spaced interval corresponding to the reciprocating travel of the pusher bar, and are operative to effect a tripping of transfer limit switch LS2 when the fully retracted and fully projected or advanced positions are attained respectively. The central control circuit, in response to the tripping of limit switch LS2, is operative to actuate valving in the hydraulic circuit of the machine to control the flow of pressurized fluid into the blank and rod ends of the transfer cylinder, achieving thereby appropriate coordinated movement of the pusher bar.

The transfer cylinder 124 and the lift cylinder 104 are preferably contained in one standardized straight section 30 of the machine which comprises a power section and may conveniently be located along any one of the straight sections of the assembled conveying apparatus. In lieu of employing a double-acting fluid actuated cylinder, alternative satisfactory means for effecting reciprocation of the lift bar and pusher bar can be employed such as, for example, a rack and pinion drive arrangement or other equivalent power drive.

In order to more clearly illustrate the coordinated operation between the lift mechanisms and the transfer mechanism, a typical lift operating cycle will now be described with particular reference to FIGURES 5-7. In the position of the work carrier, as fragmentarily shown in FIGURE 5, the engaging roller 94 on the lower surface of the work carrier arm is disposed in clearance relationship above the slide 90 of the lift mechanism. At the completion of an appropriate down-dwell period, as measured by a suitable dwell timer incorporated in the central control circuit, the lift cylinder 104 is actuated, effecting reciprocation of the lift bar and a corresponding elevation of the slide member 78, the lift pad 88, and the slide 90 carried thereby from the lowered position as shown in solid lines in FIGURES 3 and 5 to a raised position as shown in phantom in FIGURE 3 and in solid lines in FIGURE 6. At the completion of the lifting movement, the transfer cylinder 124 is energized, effecting movement of the pusher bar from the retracted position to the advanced position, with a corresponding movement of the work carrier and work carrier arm from the position as shown in FIGURE 6 in solid lines to the position as shown in phantom. During the transfer movement, the engaging roller 94 on the work carrier arm rolls along the upper surface of the slide 90 and the lift pad 88 until it comes in contact with the forward projection 92 on the slide, whereupon the slide is moved from the fully retracted position as shown in solid lines in FIGURE 6 to the fully advanced position as shown in phantom.

At the completion of the transfer movement, the lift cylinder is again actuated, effecting a lowering of the lift mechanism from the position shown in FIGURE 6 to the position shown in FIGURE 7, wherein the slide 90 on the lift pad is disposed below and in clearance relationship relative to the engaging roller 94. At the completion of the descending movement of the lift mechanism, as is signalled by the tripping of lift limit switch LS1, the dwell timer in the central control circuit is again energized and commences to time a preselected down-dwell period, during which the workpieces on the work racks are subjected to an appropriate treatment in the treating receptacle. At the same time, the transfer cylinder 124 is energized, effecting a retraction of the pusher bar from the fully advanced to the fully projected position, whereupon the engaging dogs 116 thereon are again withdrawn to a position rearwardly of the pivotally mounted pushers 118 on the work carriers, as illustrated in FIGURE 5, preparatory to the next advancing movement.

During the course of the retraction of the pusher bar, the slide 90 is also retracted from the fully projected position as shown in FIGURE 7 to the fully retracted position as shown in phantom by means of a pusher 130 affixed to and projecting upwardly from the horizontal web of the pusher bar. Accordingly, the slide 90 on movement to the retracted position is again disposed below, and engaging roller 94 of the next work carrier advanced to the position formerly occupied by the preceding work carrier during the prior advancing movement of the transfer mechanism. It is also contemplated within the scope of the present invention that, in lieu of the pusher 130 on the pusher bar, retraction of the slide 90 can be achieved by means of a coil spring 132, as illustrated in FIGURE 6, having one end thereof connected to the lift pad and the other end thereof connected to the forward end of the slide. Accordingly, the slide is moved from the fully retracted position to the fully advanced position in opposition to the resilient biasing force of the coil spring 132 by means of the coaction between the engaging roller 94 and the forward projection 92 on the slide member. After the lift mechanism is moved to the fully lowered position, the slide 90 is disposed in clearance relationship below the engaging roller on the work carrier arm and the coil spring 132 effects retraction thereof to the fully retracted position in the same manner as achieved by the pusher 130 on the pusher bar. In either event, the slide, at the completion of a lifting cycle, is retracted to a position in engaging alignment beneath the next work carrier arm to be lifted preparatory to the next lifting cycle.

It will be apparent from the foregoing description of the operating cycle that the length of the slide 90 is less than the length of the advancing or transfer movement of the work carrier. The reciprocating travel of the slide 90 during a portion of the transfer movement compensates for the discrepancy in the length of the slide and the length of travel of the work carrier, providing continuous support of the work-supporting arm throughout its travel while in an elevated position. The length of the slide 90 is controlled so as to enable retraction of the rearward portion thereof beneath and in engaging alignment with a work-supporting arm or a suitable engaging member on the carriage supporting the arm while the forward end portion of the slide is retracted to a position in vertical clearance relationship relative to the arm and work carrier at the next adjacent station, avoiding any interference therewith during the next lifting movement of the lift mechanism. This length also provides that the rearward portion of the slide 90, when in the projected position, is disposed in vertical clearance relationship relative to a work carrier which has been advanced to the preceding station, enabling unobstructed lowering of the lift mechanism and the arm supported thereon.

The operating cycle, in accordance with the mechanism as hereinbefore described, provides for a sequential transfer of the work carriers through the treating stations in accordance with the exemplary arrangement as illustrated in FIGURE 1, and whereupon the work carrier arms are elevated periodically in order that the work racks can be transferred above the intervening tank partitions. It is frequently desirable to incorporates in the machine means for selectively varying the operating cycle to which selected ones of the work carriers are subjected, in order that the workpieces thereon are subjected to a teatment deviating from the standard treatment. By virtue of the incorporation of selectivity in accordance with the mechanisms as hereinafter described, workpieces deviating in the treating sequence to which they are to be subjected can be concurrently processed on the same machine, thereby substantially enhancing the flexibility and versatility of its use and operation.

A mechanism for providing selective skip operation of selected ones of the work carriers will now be described, with particular reference to FIGURES 8-13. By virtue of such skip operation, selected ones of the work racks are retained in the elevated position above one or more treating stations, whereby the workpieces are not subjected to treatment at those stations. The remaining work racks undergo the conventional treating sequence. As best seen in FIGURES 8 and 9, each work carrier is provided with a selector rod 134 which slidably disposed in an aperture through the cross member 76 of the carriage 70 and is reciprocable to and from an inoperative or retracted position as shown in solid lines in FIGURE 9 to a projected or operative position as shown in phantom. The selector rod 134 is provided with a suitable stop or color 136 to restrict the projecting travel of the selector rod beyond a preselected position. The rearward end portion of the selector rod 134 is pivotally connected to an S-shaped link indicated at 138 which is rotatably journaled in a pair of spaced bearing members 140 mounted on the upper surface of the work carrier arm. The S-shaped link is formed with a downwardly depending leg 141, at the lower end of which a series of actuators 142 are mounted at appropriate vertically spaced increments and are movable to and from an inoperative position and an operable position. The appropriate positioning of the actuator 142 may conveniently be achieved at the load station at the time the work racks are loaded on the work carrier arm.

Each of the actuators 142, when disposed in the operative position as represented by the lowermost actuator 142 as viewed in FIGURE 8, is disposed in horizontal alignment with a projection or cam 144 stationarily mounted on the machine frame. The coaction between the actuator 142 and the cam 144, in response to the advancing movement of the work carrier, effects pivoting movement of the link 138 from the position as shown in solid lines in FIGURE 9 to the position as shown in phantom, with a corresponding movement of the selector rod 132 from the inoperative position to the operative skip position.

When the selector rod 134 is positioned in the operative skip position, the projecting end thereof is disposed in vertical engaging alignment with a latching hook 146 pivotally mounted at substantially the center of the cross member 60 at the upper end of the guide members 58 of the work carrier. The latching hook 146, as may be best seen in FIGURE 11, is formed with an annular cammed lower surface indicated at 148 which, in response to contact with the end of the selector rod 143 during the ascending movement of the work carrier arm, effects pivoting movement thereof from the position as shown in solid lines in FIGURE 11 to the position as shown in phantom. The inner engaging surface indicated at 150 of the latching hook 146 is disposed at a level slightly below that of the maximum elevation of the selector rod when the work carrier arm is supported on the lift mechanism. This position is indicated in phantom in FIGURE 11 directly above the selector rod when in the engaged position as shown in solid lines.

The latching hook is also formed with a projection 152 at the upper end thereof which is adapted to be connected to a coil spring 154, biasing the latching hook in a counterclockwise direction and into a normal engaging position. Pivoting movement of the latching hook beyond a substantially vertical position is achieved by the coaction between the projection 152 and a stop pin indicated at 156. The lower edge portion of the latching hook is connected to a link 158 which is formed with a head portion disposed in sliding relationship in a tubular member 160 formed at the end of a second link 162. The connection between the headed portion of the link 158 and the tubular member 160 provides for a lost-motion connection enabling pivoting movement of the latching hook in response to coaction with the selector rod without disturbing the position of the second link 162.

The unlatching of the latching hook and the selector rod 134 at the completion of a preselected skip cycle is achieved by a rod 164 rotatably mounted in bearings 166 supported on brackets 168 extending laterally of one of the vertical guide members 58 in a manner so as to avoid any interference with the rollers on the carrier 70. The lower end portion of the rod 164 is provided with a series of vertically spaced actuators 170 which are manually positionable in an inoperative position and an operative position consistent with the desired skip cycle required. An actuator 170, when positioned in the operative position, is disposed in horizontal alignment with a suitable cam 172 stationarily mounted on the side of the conveying machine section, effecting coaction therewith in response to the advancing movement of the work carrier (FIGURE 13) and a corresponding rotation of the rod 164 from the position as shown in solid lines in FIGURE 12 to the position as shown in phantom. Rotation of the rod 164 produces a corresponding swinging movement of a lever 174 connected at the upper end of the rod which in turn is pivotally secured to the second link 162, effecting forced retraction of the latching hook 146 to a nonengaging position as shown in phantom in FIGURE 11.

The unlatching of the latching hook is achieved while the work carrier is supported in an elevated position on a lift mechanism such that the selector rod 134 is positioned out of engaging relationship with the engaging surface 150 thereof, enabling pivoting movement of the latching hook in opposition to the resilient biasing force of the coil spring 154. The cams 172 are accordingly positioned at a longitudinal location corresponding to the completion of the advancing movement of the work carrier with its arm in the raised position, whereupon, on the subsequent lowering movement of the lift mechanism, the selector rod passes freely beyond the latching hook disposed in its retracted position.

In order to return the selector rod 134 to its retracted or inoperative position as shown in solid lines in FIGURE 9, an annularly offset portion 141a is integrally connected to the lower end portion of the leg 141 of the S-shaped link 138 which is operative to coact with a cam 175 as indicated in FIGURE 8 during the descending movement of the work carrier arm in response to the lowering movement of the lift mechanism. The retracting cam 175 is disposed adjacent to a station immediately beyond a tank partition and in vertical alignment with the end portion of the offset portion 141a when the work carrier arm has completed its advancing movement over an intervening tank partition while in the elevated position. Accordingly, the selector rod 134, which is retracted during the descending movement of the work carrier arm, remains in the retracted or inoperative position until it is again moved to the operative position by virtue of the coaction of an actuator 142 on the S-shaped link 138 with a cam 144 as shown in FIGURE 9, whereupon a second skip operation occurs as desired.

It will be apparent from the foregoing arrangement that, by simply positioning the actuators 142 and 170 and the cams 144 and 172, respectively, selected ones of the work carrier arms will be retained in the elevated position for a preselected number of treating stations in response to the retaining coaction between the selector rod and latching hook.

In addition to the selected skip cycle as hereinabove described in connection with FIGURES 8-13, it is also contemplated within the scope of the present invention that a delayed dip operation of select ones of the work carriers can be attained at selected treating stations. An exemplary delay dip mechanism is illustrated in FIGURES 14 and 15 whereby certain ones of the work carrier arms are retained in an elevated position for a preselected time period after the lowering of the principal lift mechanisms, providing therewith a corresponding reduction in the total treating time to which the workpieces are subjected at that station. As shown in FIGURES 14 and 15, a principal lift mechanism 50 of a type hereinbefore described is provided which is disposed in side-by-side relationship to a slave lift section indicated at 176 provided with a lift pad 88 and slide 90 identical to that of the principal lift mechanism. The lift pad 88 is securely mounted to the upper end of a piston rod 178 of a hydraulic cylinder 180 which is provided with a piston 182 at the lower end thereof. The lower portion of the cylinder 180 is immersed in a reservoir of hydraulic fluid, indicated at 184, which passes into the interior of the cylinder through a check valve 186 and is drained therefrom through an escape valve 188, which is remotely actuable in response to a suitable delay timer indicated at 190.

Elevation of the slave lift section 176 from the lowered position as shown in FIGURE 14 to a raised position is achieved in response to the coaction of a pair of side brackets 192 on the lifting pad of the principal lift mechanism which are disposed beneath and in lifting engagement with the lifting pad of the slave section. Accordingly, the slave section is elevated in unison with the principal lift mechanism each time the lift bar is reciprocated. During the course of the elevating movement of the slave lift section, hydraulic fluid is drawn into the interior of the cylinder 180 from the reservoir through the check valve 186. Accordingly, the entire interior of the cylinder beneath the piston 182 becomes filled with hydraulic fluid and serves to retain the slave lift section in the elevated position after the principal lift mechanism has been lowered. Fluid is prevented from leaking from the interior of the cylinder by means of the check valve 186 and the escape valve 188 until such time that the delay timer 190 times out, effecting thereby an energization of a solenoid 194 which is operative to move a link 196 connected to the escape valve, enabling the hydraulic fluid to drain from the interior of the cylinder. The slave lift section accordingly descends in response to the gravitational weight of the work carrier arm and the work rack supported therefrom.

It is also contemplated within the scope of the present invention that a delayed dip operation can be achieved for selected ones of the work carriers by substituting a pair of solenoids for the side brackets 192 which are selectively actuable to engage the slave lift section, effecting a lifting thereof in response to the ascending movement of the principal lift mechanism. Selectivity can be suitably achieved by an actuator carried by the work carrier arm which is adjustably positionable to trip a suitable limit switch, effecting thereby actuation of the solenoids. Accordingly, by this latter arrangement, the slave section remains in the lowered position in ordinary operation and is raised only at such time that a work carrier having an actuator positioned in the operative position trips a delay dip limit switch effecting engagement of the principal lift mechanism with the slave lift section.

In addition to the skip operation and the delayed dip operation as hereinabove described, it is also contemplated that the machine comprising the present invention can be equipped with an early pickup operation whereby selected work carriers are elevated to the raised position at an intermediate station of a multiple station tank and are thereafter retained in the elevated position for the remaining stations thereof, thereby skipping the balance of treatment and providing a corresponding reduction in the total treatment time. A typical early pickup arrangement is fragmentarily illustrated in FIGURES 16 and 17, wherein means are provided for selectively coupling an auxiliary lift section to the principal lift bar effecting a raising of that work carrier arm to the elevated position. As shown in FIGURE 16, the principal lift bar 98 which is slidably disposed in the shoe 100 is provided with a bracket 204 affixed to and projecting laterally of the horizontal web thereof. A slide bar 206 is slidably mounted in a guide shoe 208 for reciprocation longitudinally and substantially parallel to the lift bar 98. An auxiliary slide member 210, as fragmentarily shown in FIGURE 17, which is identical to the slide members 78 of the principal lift mechanisms, is connected by means of an auxiliary lift chain 212 at its lower end portion. The auxiliary lift chain is trained over an auxiliary sprocket 214 and extends therefrom horizontally and is connected to a bracket 216 on the slide bar 206.

The upstanding web of the slide bar 206 is provided with a bracket 218 on which a solenoid 220 is mounted, having the plunger end thereof connected to an engaging block 222, which is reciprocable to and from an inoperative position disposed in lateral clearance relationship relative to the bracket 204 and an operative position as shown in dotted lines in FIGURES 16 and 17 wherein it is disposed in longitudinal alignment with the bracket 204. Energization of the solenoid 220 is selectively achieved by means of an early pickup selector limit switch LS4 stationarily mounted on the side of the machine as illustrated in FIGURE 17 which is adapted to be tripped by an actuator 224 carried by an arm 226 affixed to the work carrier. The actuator 224 is manually positionable in an inoperative position in which it is disposed out of horizontal alignment with the lever 228 of the limit switch LS4 and an operative position as shown in solid lines in FIGURE 17 in which it is effective to trip the limit switch in response to the advancing movement of the work carrier. In the exemplary embodiment as illustrated in FIGURE 17, the arm 226 is elongated in order to accommodate a plurality of actuators 224, each of which is respectively oriented relative to other early pickup selector switches LS4 as indicated in phantom for effecting selected early pickup of work carrier arms at a plurality of different locations along the length of the conveying machine as may be desired.

In accordance with the arrangement as illustrated in FIGURES 16 and 17, the actuation of the selector switch LS4 by the actuator 224 effects an energization of the solenoid 220 and a corresponding movement of the engaging block 222 to an operative position, thereby coupling the slide bar 206 to the principal lift bar during its next reciprocating movement. Accordingly, when the lift cylinder is energized, reciprocation of the lift bar effects a corresponding elevation of the auxiliary lift member which is identical in construction to the principal lift mechanisms hereinbefore described and a corresponding elevation of a work carrier arm to the raised position. In order to retain the arm in the elevated position for the balance of the treating stations of the multiple station tank, the actuator 142 on the link 138, in accordance with the construction as previously described in FIGURES 8 and 9, and as clearly shown in FIGURE 17, is moved to an operative position whereupon it is disposed in alignment with the cam 144, effecting movement of the selector rod 134 (FIGURE 9) to the operative skip position in which it is engaged by the latching hook at the upper end portion of the guide members of the work carrier. Accordingly, the work carrier arm remains in the elevated position and is subsequently unlatched in accordance with the mechanism as previously described and illustrated in FIGURES 10–13.

A detailed description will now be made in connection with the arcuate turn-around sections 32 of the machine, as may be best seen in FIGURES 18–20, which are constructed so as to provide for a continuity in the reciprocating movement of the lift bars and pusher bars to the opposite straight side portion of the machine. As illustrated in FIGURES 18–20, the arcuate turn-around section is formed with a pair of arcuate channel tracks 230 in which a series of articulated links 232 are movably disposed and extend arcuately therearound. One end of each link 232 is formed with a pair of spaced prongs 234, between which the opposite end of the adjacent link is positioned and which are pivotally connected together by means of a pin 236. A roller 238 is rotatably mounted on the opposite projecting ends of the pin 236 which are disposed in rolling bearing contact against the side surfaces of the channel tracks 230. In order to provide engagement with the pivotally mounted pushers 118 on the work carriers, certain ones of the pins 236, as best seen in FIGURE 19, project upwardly beyond the surface of the uppermost roller 238 and are adapted to be disposed in engaging relationship with the pushers 118, effecting advancement of the carrier during the advancing movement of the transfer mechanism. The terminal links of the transfer mechanism and the lift mechanism are connected, respectively, to the ends of the pusher bar 112 and the lift bar 98, providing therewith continuity of the reciprocating motion of the pusher bar and lift bar around the entire length of the machine. It is also contemplated that lift mechanisms can be located at selected intervals along the arcuate turn-around sections 32 as may be required in order to lift work racks above any tank partitions or other obstructions located therealong.

A typical operating sequence of the conveying machine will now be described with reference to the diagrammatic side elevation views as sequentially illustrated in FIGURES 21–24. The arrangement of the treating receptacles 36 and the partitions 38 is intended to typify a typical treating sequence including multiple station treating receptacles as well as single station treating receptacles. The work carriers 34 are disposed at spaced intervals along the machine and support work racks indicated at R1–R8, respectively. In the position of the machine as illustrated in FIGURE 21, the pusher mechanism is in the fully retracted position and the lift mechanisms are in the fully lowered position. At the completion of a preselected down-dwell period, as determined by a suitable dwell timer in the central control circuit, the lift cylinder is energized, effecting an elevation of each of the lift mechanisms and a movement of work racks R2, R5, R6 and R7 from the lowered position as shown in FIGURE 21 to the raised position as shown in FIGURE 2. When the lift mechanisms attain the fully elevated position as signalled by the tripping of the lift limit switch by the actuators on the lift bar, the transfer cylinder is energized, effecting reciprocating movement of the pusher bar and a corresponding horizontal movement of each of the work carriers and the work racks supported therefrom from the positions shown in FIGURE 22 to the positions as shown in FIGURE 23. During the transfer movement of the work carriers, work racks R2, R5, R6 and R7 are transferred above the intervening tank partitions 38 to a position disposed above the first station at the next adjacent treating receptacle.

The work carrier supporting the work rack R2 has been programmed to provide for a skip operation of the work rack R2 in the three-station receptacle encompassing stations S25 through S27 by appropriately positioning the actuator 142 in accordance with the mechanisms illustrated in FIGURES 8 and 9. In addition, the work carrier supporting work rack R5 has been programmed to provide for a delayed dip operation in the single station tank corresponding to station S28, providing a selected reduction in the duration of treatment received by the workpieces supported thereon. Accordingly, at the completion of the transfer movement of the pusher bar as signaled by the transfer limit switch, the lift cylinder is again actuated, effecting a lowering of the lift mechanisms from the positions as shown in FIGURE 23 to the position as shown in FIGURE 24. Work racks R6 and R7 are lowered into the treating stations S29 and S30, respectively, whereas work rack R2 is retained in the elevated skip position while work rack R5 is temporarily retained in the elevated position for a preselected period after the principal lift mechanisms have been lowered. Retention of the work rack R5 in the elevated position is achieved by means of a slave lift section 176 corresponding in structure to the slave section as illustrated in FIGURE 14. At the completion of a preselected delay time period as established by a suitable delay timer in the central control circuit, the slave lift section is permitted to descend, thereby moving the work rack R5 from the elevated position as shown in solid lines in FIGURE 24 to the lowered position as shown in phantom. The work racks thereafter remain in the positions as shown in FIGURE 24 until the timing out of the principal down-dwell timer, at which time the cycle is repeated in accordance with the sequence as hereinabove described.

An alternative satisfactory construction of a work carrier, which provides for positive guiding movement of the work carrier arm along the vertical guide members, is illustrated in FIGURES 25 and 26. The work carrier as illustrated in FIGURES 25 and 26 is similar to that previously described and which provides increased smoothness in operation and is readily adaptable to fabrication by commercially available processes and machines. The work carrier 240, as indicated in FIGURE 25, consists of a pair of spaced side members 242 which are provided with a lateral inwardly offset portion 244 between the ends thereof, providing additional clearance between the inner faces of the tracks 40, thereby facilitating a transfer of the work carrier along the arcuate end sections of the machine. The end portions of the side members 242, on which rollers 246 are mounted for engagement with the upper and lower edges of the tracks 40, are disposed adjacent to the inner faces of the tracks but spaced in sufficient clearance relationship therefrom to avoid any interference during movement of the work carrier along the arcuate track sections. This construction of the side members 242 avoids the necessity of employing a substantial clearance between the side faces of the side members 54 and the inner faces of the tracks 40 in the work carrier 34 construction as previously described so as to avoid any binding or interference between the track and carrier when traversing arcuate rail sections. The rollers 246 may be flanged rollers so as to overlie and engage the outer side surfaces of the tracks 40, preventing undesirable lateral movement of each of the side members 242 or, alternatively, each side member can be provided with a side roller indicated at 248 which is disposed in rolling bearing contact against the outer face of the track 40.

A pair of substantially upright parallel spaced guide members 250 are rigidly secured to the forward end portions of each side member 244. Each guide member comprises a pair of channels indicated at 252a, 252b, disposed at 90° to each other and are rigidly secured together as best seen in FIGURE 26. A cross member 254 is securely fastened to and extends between the forward upper end portions of the guide members 250.

The work carrier arm, in accordance with the construction as shown in FIGURE 25, consists of a central section 356 which is formed with flanges 258 at the ends thereof to which any one of a variety of suitable arm extensions such as the extension section 260 can be rigidly affixed by means of bolts 262. The type of extension section 260 can be readily varied to accommodate a particular type of work rack as well as to provide for a variation in the lateral width of the work carrier arm consistent with the spacing of the treating receptacles. The central section 256 of the work carrier arm is securely fastened or integrally formed with a transverse member 264 which extends between the guide members 250 and is provided with a pair of vertically spaced rollers 266 along each side edge thereof which are adapted to be disposed in rolling bearing engagement within the channels 252a of each guide member. The transverse member 264 is also formed with a pair of L-shaped brackets 268 disposed in vertically spaced relationship on which rollers 270 are mounted and are positioned in rolling bearing engagement with the inner surfaces of channels 252b. While two L-shaped brackets 268 and two rollers 270 along each side are preferred, satisfactory operation and smooth guiding movement of the work carrier arm is obtained with only one roller 270 at one or both sides of the transverse member 264.

The center portion of the central section 256 is formed with a pair of opposed notches 272 along the forward and trailing edges thereof in which engaging rollers 274 are rotatably mounted and are adapted to be disposed in rolling bearing engagement against the upper edge of the slide 90 of a lift mechanism 50, in accordance with the arrangement previously described. Accordingly, the lifting of the work carrier arm, while it is disposed in guided relationship relative to the guide members, proceeds in accordance with the same sequential operation and is adaptable to variations in the standard processing sequence of the types hereinbefore described. Similarly, advancement of the work carrier from one station to the next station is achieved by a suitable transfer mechanism such as the reciprocating pusher transfer mechanism previously described, including engaging dogs which are adapted to engage the pusher 118 mounted on the inner surface of the side member 242, as shown in FIGURE 25.

While it will be apparent that the preferred embodiments of the invention disclosed are well calculated to fulfill the objects above stated, it will be appreciated that the invention is susceptible to modification, variation and change without departure from the proper scope or fair meaning of the subjoined claims.

What is claimed is:

1. A conveying machine for conveying workpieces through a series of treating stations comprising track means extending along the treating stations, a work carrier movably mounted on said track means, upright guide means on said work carrier, a carriage including a work-supporting arm movably mounted on said guide means, transfer means for intermittently advancing said work carrier along said track means, and lift means for moving said carriage and said work-supporting arm to and from a lowered position and a raised position and for retaining said carriage and arm in the raised position during advancement of said work carrier from one station to the next adjacent station, said lift means including a supporting member extending longitudinally of said track means and of a length less than the distance of advancing travel of said work carrier, said supporting member longitudinally reciprocable from a retracted position in which the rearward end portion thereof is disposed in engaging alignment below said carriage and said arm and a projected position in which the forward end portion thereof is disposed in engaging alignment below said carriage and said arm.

2. A conveying machine for conveying workpieces through a series of treating stations comprising track means extending along the treating stations, a work carrier movably mounted on said track means, upright guide means on said work carrier, a carriage including a work-supporting arm movably mounted on said guide means, transfer means for intermittently advancing said work carrier along said track means, and lift means for moving said carriage and said work-supporting arm to and from a lowered position and a raised position, said lift means including a supporting member extending longitudinally of said track means and operable to engage and movably support said carriage and said arm when elevated above said track means, said supporting member longitudinally reciprocable from a retracted position in which the rearward end portion thereof is disposed in engaging alignment below said carriage and said arm to a projected position longitudinally spaced forwardly therefrom in response to the advancing movement of said work carrier when said carriage and said arm are in said raised position.

3. A conveying machine for conveying workpieces through a series of treating stations comprising track means extending along the treating stations, a work carrier movably mounted on said track means, upright guide means on said work carrier, a carriage including a work-supporting arm movably mounted on said guide means, transfer means for intermittently advancing said work carrier along said track means, and lift means for moving said carriage and said work-supporting arm to and from a lowered position and a raised position, said lift means including a supporting member extending longitudinally of said track means and operable to engage and movably support said carriage and said arm when elevated above said track means, said supporting member longitudinally reciprocable from a retracted position in which the rearward end portion thereof is disposed in engaging alignment below said carrier and said arm to a projected position longitudinally spaced forwardly therefrom in response to the advancing movement of said work carrier when said carriage and said arm are in said raised position, and means for moving said supporting member from the projected position to the retracted position after said lift means has attained the lowered position.

4. A conveying machine for conveying workpieces through a series of treating stations comprising track means extending along the treating stations, a work carrier movably mounted on said track means, upright guide means on said work carrier, a carriage including a work-supporting arm movably mounted on said guide means, transfer means for intermittently advancing said work carrier along said track means, and lift means for moving said carriage and said work-supporting arm to and from a lowered position and a raised position, said lift means including a supporting member extending longitudinally of said track means and operable to engage and movably support said carriage and said arm when elevated above said track means, said supporting member longitudinally reciprocable from a retracted position in which the rearward end portion thereof is disposed in engaging alignment below said carriage and said arm to a projected position longitudinally spaced forwardly therefrom in response to the advancing movement of said work carrier when said carriage and said arm are in said raised position, and coacting means on said transfer means for moving said supporting member from the projected position to the retracted position after said lift means has attained the lowered position in response to the retracting movement of said transfer means.

5. A conveying machine for conveying workpieces through a series of treating stations comprising track means extending along the treating stations, a work carrier movably mounted on said track means, upright guide means on said work carrier, a carriage including a work-supporting arm movably mounted on said guide means, transfer means for intermittently advancing said work carrier along said track means, and lift means for moving said carriage and said work-supporting arm to and from a lowered position and a raised position, said lift means including a supporting member extending longitudinally of said track means and operable to engage and movably support said carriage and said arm when elevated above said track means, said supporting member longitudinally reciprocable from a retracted position in which the rearward end portion thereof is disposed in engaging alignment below said carriage and said arm to a projected position longitudinally spaced forwardly therefrom in response to the advancing movement of said work carrier when said carriage and said arm are in said raised position, and means operatively associated with said supporting member urging said supporting member toward the retracted position and for moving said supporting member from the projected position to the retracted position after said lift means has attained the lowered position.

6. A conveying machine for conveying workpieces through a series of treating stations comprising track means extending along the treating stations, a work carrier movably mounted on said track means, upright guide means on said work carrier, a carriage including a work-supporting arm movably mounted on said guide means, transfer means for intermittently advancing said work carrier along said track means, and lift means for moving said carriage and said work-supporting arm to and from a lowered position and a raised position, said lift means including a frame, a column movably mounted on said frame for reciprocation between a raised position and a lowered position, means for reciprocating said column between the positions, a supporting member on the upper end of said column extending longitudinally of said track means and operable to engage and movably support said carriage and said arm when elevated above said track means, said supporting member longitudinally reciprocable from a retracted position in which the rearward end portion thereof is disposed in engaging alignment below said carriage and said arm to a projected position longitudinally spaced forwardly therefrom in response to the advancing movement of said work carrier when said carriage and said arm are in said raised position, and means for moving said supporting member from the projected position to the retracted position after said lift means has attained the lowered position.

7. A conveying machine for conveying workpieces through a series of treating stations comprising track means extending along the treating stations, a work carrier movably mounted on said track means, upright guide means on said work carrier, a carriage including a work-supporting arm movably mounted on said guide means, transfer means for intermittently advancing said work carrier along said track means, and a plurality of lift means disposed at longitudinally spaced intervals along said track means for moving said carriage and said work-supporting arm to and from a lowered position and a raised position, each said lift means including a frame, a column movably mounted on said frame for reciprocation between a raised position and a lowered position, a supporting member on the upper end of said column extending longitudinally of said track means and operable to engage and movably support said carriage and said arm when elevated above said track means, said supporting member longitudinally reciprocable from a retracted position in which the rearward end portion thereof is disposed in engaging alignment below said carriage and said arm to a projected position longitudinally spaced forwardly therefrom in response to the advancing movement of said work carrier when said carriage and said arm are in said raised position, means for moving said supporting member from the projected position to the retracted position after said lift means has attained the lowered position, and power means for moving each of said plurality of lift means in unison to and from a lowered position and a raised position including a lift bar extending longitudinally along said track means, means for reciprocating said lift bar to and from a projected position and a retracted position, and means drivingly coupled to said lift bar and to said column effecting up and down reciprocation of said column in response to reciprocation of said lift bar.

8. A conveying machine for conveying workpieces through a series of treating stations comprising track means extending along the treating stations, a work carrier movably mounted on said track means, upright guide means on said work carrier, a carriage including a work-supporting arm movably mounted on said guide means, transfer means for intermittently advancing said work carrier along said track means, and a plurality of lift means disposed at longitudinally spaced intervals along said track means for moving said carriage and said work-supporting arm to and from a lowered position and a raised position, each of the plurality of said lift means comprising a frame, a column movably mounted on said frame for reciprocation between a raised position and a lowered position, a lift pad mounted on the upper end of said column, a slide member slidably disposed in said lift pad and extending longitudinally of said track means and operable to engage and movably support said carriage and said arm when elevated above said track means, said slide member longitudinally reciprocable from a retracted position in which the rearward end portion thereof is disposed in engaging alignment below said carriage and said arm to a projected position longitudinally spaced forwardly therefrom in response to coaction with said carriage and said arm during the advancing movement thereof when in said raised position, means for moving said slide member from the projected position to the retracted position after said lift means has attained the lowered position, and power means for effecting vertical reciprocation of said column of each of said plurality of lift means in unison, including a lift bar extending longitudinally of said track means and adjacent to said lift means disposed therealong, a double-acting fluid actuated cylinder operatively connected to said lift bar for effecting longitudinal reciprocation thereof to and from an advanced position and a retracted position, a flexible element connected to said lift bar and to said column of each of said lift means and operable to effect up-and-down movement of said column in response to longitudinal reciprocation of said lift bar, and means for controlling the length of reciprocating travel of said lift bar.

9. A conveying machine for conveying workpieces through a series of treating stations comprising track means extending along the treating stations, a work carrier movably mounted on said track means, upright guide means on said work carrier, a carriage including a work-supporting arm movably mounted on said guide means, reciprocable pusher means extending longitudinally of said track means for engaging and intermittently advancing said work carrier along said track means, and lift means for moving said carriage and said work-supporting arm to and from a lowered position and a raised position, said lift means including a supporting member extending longitudinally of said track means and operable to engage and movably support said carriage and said arm when elevated above said track means, said supporting member longitudinally reciprocable from a retracted position in which the rearward end portion thereof is disposed in engaging alignment below said carriage and said arm to a projected position longitudinally spaced forwardly therefrom in response to the advancing movement of said carrier when said carriage and said arm are in said raised position, and means for moving said supporting member from the projected position to the retracted position after said lift means has attained the lowered position.

10. A conveying machine for conveying workpieces through a series of treating stations comprising track means extending along the treating stations, a work carrier movably mounted on said track means, upright guide means on said work carrier, a carriage including a work-supporting arm movably mounted on said guide means, reciprocable pusher means including a pusher bar extending longitudinally of said track means, means for reciprocating said pusher bar to and from a retracted position and an advanced position, pusher dogs on said pusher bar disposed at spaced intervals therealong, a pusher on said work carrier engageable by said pusher dog for intermittently advancing said work carrier along said track means in response to the advancing movement of said pusher bar, and lift means for moving said carriage and said work-supporting arm to and from a lowered position and a raised position, said lift means including a supporting member extending longitudinally of said track means and operable to engage and movably support said carriage and said arm when elevated above said track means, said supporting member longitudinally reciprocable from a retracted position in which the rearward end portion thereof is disposed in engaging alignment below said carriage and said arm to a projected position longitudinally spaced forwardly therefrom in response to the advancing movement of said carrier when said carriage and said arm are in said raised position, and means for moving said supporting member from the projected position to the retracted position after said lift means has attained the lowered position.

11. A conveying machine for conveying workpieces through a series of treating stations comprising track means extending along the treating stations, a work carrier movably mounted on said track means, upright guide means on said work carrier, a carriage including a work-supporting arm movably mounted on said guide means, reciprocable pusher means including a pusher bar extending longitudinally of said track means, means for reciprocating said pusher bar to and from a retracted position and an advanced position, pusher dogs on said pusher bar disposed at spaced intervals therealong, a pivotally mounted pusher on said work carrier engageable by said pusher dog for intermittently advancing said work carrier along said track means in response to the advancing movements of said pusher bar, and lift means for moving said carriage and said work-supporting arm to and from a lowered position and a raised position, said lift means including a supporting member extending longitudinally of said track means and operable to engage and movably support said carriage and said arm when elevated above said track means, said supporting member longitudinally reciprocable from a retracted position in which the rearward end portion thereof is disposed in engaging alignment below said carriage and said arm to a projected position longitudinally spaced forwardly therefrom in response to the advancing movement of said carrier when said carriage and said arm are in said raised position, and pusher means on said pusher bar for moving said supporting member from the projected position to the retracted position after said lift means has attained the lowered position in response to the retracting movement of said pusher bar.

12. A conveying machine for conveying workpieces through a series of treating stations comprising track means extending along the treating stations, a plurality of work carriers movably mounted on said track means, each of said work carriers including upright guide means thereon and a carriage including a work-supporting arm movably mounted on said guide means, a reciprocable pusher bar extending longitudinally of said track means and including a plurality of pusher dogs disposed at spaced intervals therealong, a pusher on each of said work carriers engageable by said pusher dogs for intermittently advancing said work carriers along said track means, means for reciprocating said pusher bar to and from a retracted position and an advanced position, a plurality of lift means disposed at spaced intervals along said track means, each of said lift means including a supporting member extending longitudinally of and between said track means and operable to engage and movably support a carriage and the work-supporting arm thereon when elevated above said track means, said supporting member of each said lift means longitudinally reciprocable from a retracted position in which the rearward end portion thereof is disposed in engaging alignment below said carriage and said arm of a work carrier to a projected position longitudinally spaced forwardly therefrom in response to the advancing movement of said carrier when said carriage and said arm are in a raised position, means for moving said supporting member from the projected position to the retracted position before the next lifting movement of said lift means, and power means including a lift bar extending longitudinally of said track means and reciprocable to and from an advanced position and a retracted position, coacting means connected to said lift bar and to each said lift means effecting movement of each said lift means in unison between said raised and said lowered positions in response to reciprocation of said lift bar, and means for reciprocating said lift bar between the positions.

13. A conveying machine for conveying workpieces through a series of treating stations comprising track means extending along the treating stations, a plurality of work carriers movably mounted on said track means, upright guide means on each said work carrier, a carriage including work supporting means thereon movably mounted on each said guide means, transfer means extending longitudinally of said track means for engaging and intermittently advancing said work carriers along said track means, at least one lift means positioned at a station for sequentially moving each said carriage and the work supported thereon to and from a lowered position and a raised position, said lift means including a supporting member extending longitudinally of said track means and operable to engage and movably support said carriage when elevated above said track means, said supporting member longitudinally reciprocable from a retracted position in which the rearward end portion thereof is disposed in engaging alignment below said carriage to a projected position longitudinally spaced forwardly therefrom in response to the advancing movement of said carrier when said carriage is in said raised position, means for moving said supporting member from the projected position to the retracted position before the next lifting movement of said lift means, and coacting means on at least one said work carrier and said carriage selectively actuable for retaining selected ones of said carriages and the work supported therefrom in said raised position after said lift means is lowered.

14. A conveying machine for conveying workpieces through a series of treating stations comprising track means extending along the treating stations, a plurality of work carriers movably mounted on said track means, upright guide means on each said work carrier, a carriage including work-supporting means thereon movably mounted on each said guide means, transfer means extending longitudinally of said track means for engaging and intermittently advancing said work carriers along said track means, at least one lift means positioned at a station for sequentially moving each said carriage and the work supported thereon to and from a lowered position and a raised position, said lift means including a supporting member extending longitudinally of said track means and operable to engage and movably support said carriage when elevated above said track means, said supporting member longitudinally reciprocable from a retracted position in which the rearward end portion thereof is disposed in engaging alignment below said carriage to a projected position longitudinally spaced forwardly therefrom in response to the advancing movement of said carrier when said carriage is in said raised position, means for moving said supporting member from the projected position to the retracted position before the next lifting movement of said lift means, engaging means on at least one said carriage selectively movable to and from an engaging position and a non-engaging position, coacting means on said work carrier operable when said carriage is in said raised position to engage said engaging means when in said engaging position for retaining said carriage in the raised position after said lift means has been lowered, and means for selectively disengaging said engaging means and said coacting means enabling said carriage to descend to said lowered position.

15. A conveying machine for conveying workpieces through a series of treating stations comprising track means extending along the treating stations, a plurality of work carriers movably mounted on said track means, upright guide means on each said work carrier, a carriage including work-supporting means thereon movably mounted on each said guide means, transfer means extending longitudinally of said track means for engaging and intermittently advancing said work carriers along said track means, at least one lift means positioned at a station for sequentially moving each said carriage and the work supported thereon to and from a lowered position and a raised position, said lift means including a supporting member extending longitudinally of said track means and operable to engage and movably support said carriage when elevated above said track means, said supporting member longitudinally reciprocable from a retracted position in which the rearward end portion thereof is disposed in engaging alignment below said carriage to a projected position longitudinally spaced forwardly therefrom in response to the advancing movement of said carrier when said carriage is in said raised position, means for moving said supporting member from the projected position to the retracted position before the next lifting movement of said lift means, engaging means on each of said carriage, coacting means on each said work carrier, means responsive to the advancing movement of said work carrier for selectively positioning said engaging means and said coacting means in operative relationship for retaining said carriage in the elevated position after said lift means has been lowered, and means operable to selectively disengage said engaging means and said coacting means enabling movement of said carriage from said raised position to a lowered position in response to the descending movement of a lift means disposed in supporting relationship relative thereto.

16. A conveying machine for conveying workpieces through a series of treating stations comprising track means extending along the treating stations, a plurality of work carriers movably mounted on said track means, upright guide means on each said work carrier, a carriage including a work-supporting means thereon movably mounted on each said guide means, transfer means extending longitudinally of said track means for engaging and intermittently advancing said work carriers along said track means, a plurality of lift means positioned at longitudinally spaced intervals along said track means for sequentially moving each said carriage and the work supported thereon to and from a lowered position and a raised position, each said lift means including a supporting member extending longitudinally of said track means and operable to engage and movably support said carriage when elevated above said track means, said supporting member longitudinally reciprocable from a retracted position in which the rearward end portion thereof is disposed in engaging alignment below said carriage to a projected position longitudinally spaced forwardly therefrom in response to the advancing movement of said carrier when said carriage is in said raised position, and means for moving said supporting member from the projected position to the retracted position before the next lifting movement of said lift means, power means for moving the plurality of said lift means to and from said raised position and said lowered position, at least one of said lift means normally inoperable and selectively actuable for sequentially engaging selected ones of said carriages effecting a lifting of said carriage and the work supported thereon to a raised position, and coacting means on said carriage and said work carrier for retaining said carriage in said raised position after said lift means is lowered, providing therewith an early pickup operation.

17. A conveying machine for conveying workpieces through a series of treating stations comprising track means extending along the treating stations, a plurality of work carriers movably mounted on said track means, upright guide means on each said work carrier, a carriage including a work-supporting means thereon movably mounted on each said guide means, transfer means extending longitudinally of said track means for engaging and intermittently advancing said work carriers along said track means, a plurality of lift means positioned at longitudinally spaced intervals along said track means for sequentially moving each said carriage and the work supported thereon to and from a lowered position and a raised position, each said lift means including a supporting member extending longitudinally of said track means and operable to engage and movably support said carriage when elevated above said track means, said supporting member longitudinally reciprocable from a retracted position in which the rearward end portion thereof is disposed in engaging alignment below said carriage to a projected position longitudinally spaced forwardly therefrom in response to the advancing movement of said carrier when said carriage is in said raised position, and means for moving said supporting member from the projected position to the retracted position before the next lifting movement of said lift means, power means including a lift bar extending longitudinally of said track means adjacent said lift means and mounted for longitudinal reciprocation to and from a retracted position and a projected position, coacting means on said lift bar and each said lift means operable for effecting a lifting and lowering movement of said lift means in response to the reciprocating movement of said lift bar, means for reciprocating said lift bar, at least one said lift means normally disengaged from said lift bar and selectively engageable for sequentially engaging selected ones of said carriages effecting a lifting of the work supported thereon to a raised position, and coacting means on said work carrier and said carriage for retaining said carriage in said raised position, providing therewith an early pickup operation.

18. A conveying machine for conveying workpieces through a series of treating stations comprising track means extending along the treating stations, a plurality of work carriers movably mounted on said track means, upright guide means on each said work carrier, a carriage including a work-supporting means thereon movably mounted on each of said guide means, transfer means extending longitudinally of said track means for engaging and intermittently advancing said work carriers along said track means, a plurality of lift means positioned at longitudinally spaced intervals along said track means for sequentially moving each said carriage and the work supported thereon to and from a lowered position and a raised position, each said lift means including a supporting member extending longitudinally of said track means and operable to engage and movably support said carriage when elevated above said track means, said supporting member longitudinally reciprocable from a retracted position in which the rearward end portion thereof is disposed in engaging alignment below said carriage to a projected position longitudinally spaced forwardly therefrom in response to the advancing movement of said carrier when said carriage is in said raised position, and means for moving said supporting member from the projected position to the retracted position before the next lifting movement of said lift means, power means for moving each said lift means in unison to and from said lowered position to said raised position, at least one of said lift means normally inoperable and selectively engageable by said power means in response to the advancing movement of selected ones of said work carriers for sequentially engaging and lifting a carriage and the work supported thereon to a raised position, coacting means on said carriage and said work carrier for retaining said carriage and the work thereon in said raised position after said lift means is lowered, and means selectively operable for disengaging said coacting means enabling lowering movement of said carriage while supported on a lift means longitudinally spaced from the selectively actuable said lift means.

19. A conveying machine for conveying workpieces through a series of treating stations comprising track means extending along the treating stations, a plurality of work carriers movably mounted on said track means, upright guide means on each of said work carriers, a carriage including work-supporting means thereon movably mounted on each said guide means, transfer means extending longitudinally of said track means for engaging and intermittently advancing said work carriers along said track means, a plurality of lift means disposed at longitudinally spaced intervals along said track means for sequentially moving each said carriage and the work supported thereon to and from a lowered position and a raised position, each said lift means including a supporting member extending longitudinally of said track means and operable to engage and movably support said carriage when elevated above said track means, said supporting member longitudinally reciprocable from a retracted position in which the rearward end portion thereof is disposed in engaging alignment below said carriage to a projected position longitudinally spaced forwardly therefrom in response to the advancing movement of said carrier when said carriage is in said raised position, means for moving said supporting member from the projected position to the retracted position before the next lifting movement of said lift means, power means for moving each of said lift means in unison from the lowered position to said raised position, at least one of said lift means comprising an auxiliary lift means including means selectively actuable for retaining said auxiliary lift means and a selected said carriage supported thereon in said raised position for a preselected time period after the remaining said lift means are lowered.

20. A conveying machine for conveying workpieces through a series of treating stations comprising track means extending along the treating stations, a plurality of work carriers movably mounted on said track means, upright guide means on each of said work carriers, a carriage including work-supporting means thereon movably mounted on each said guide means, transfer means extending longitudinally of said track means for engaging and intermittently advancing said work carriers along said track means, a plurality of lift means disposed at longitudinally spaced intervals along said track means for sequentially moving each said carriage and the work supported thereon to and from a lowered position and a raised position, each said lift means including a supporting member extending longitudinally of said track means and operable to engage and movably support said carriage when elevated above said track means, said supporting member longitudinally reciprocable from a retracted position in which the rearward end portion thereof is disposed in engaging alignment below said carriage to a projected position longitudinally spaced forwardly therefrom in response to the advancing movement of said carrier when said carriage is in said raised position, means for moving said supporting member from the projected position to the retracted position before the next lifting movement of said lift means, power means for moving each of said lift means in unison from said lowered position to said raised position, at least one of said lift means comprising an auxiliary lift means movable from said raised position to said lowered position independently of the remaining said lift means, said auxiliary lift means selectively operable in response to the advancing movement of selected ones of said work carriers to retain said carriage and the work supported thereon in the raised position after the remaining said lift means are lowered, and presettable timer means for controlling the length of time said selected carriage is retained in said raised position.

21. A conveying machine for conveying workpieces through a series of treating stations comprising track means extending along the treating stations, a plurality of work carriers movably mounted on said track means, upright guide means on each of said work carriers, a carriage including work-supporting means thereon movably mounted on each said guide means, transfer means extending longitudinally of said track means for engaging and intermittently advancing said work carriers along said track means, a plurality of lift means disposed at longitudinally spaced intervals along said track means for sequentially moving each said carriage and the work supported thereon to and from a lowered position and a raised position, each said lift means including a supporting member extending longitudinally of said track means and operable to engage and movably support said carriage when elevated above said track means, said supporting member longitudinally reciprocable from a retracted position in which the rearward end portion thereof is disposed in engaging alignment below said carriage to a projected position longitudinally spaced forwardly therefrom in response to the advancing movement of said carrier when said carriage is in said raised position, means for moving said supporting member from the projected position to the retracted position before the next lifting movement of said lift means, power means for moving each of said lift means in unison from the lowered position to said raised position, at least one of said lift means comprising a delay dip mechanism including a cylinder, a piston rod reciprocably mounted in said cylinder to the upper end of which said supporting member is reciprocably mounted, valve means for admitting a liquid into the interior of said cylinder in response to the ascending movement of said piston rod and said supporting member thereon, and second valve means selectively operable a preselected time period after the remaining said lift means are lowered for enabling escape of said liquid from the interior of said cylinder permitting independent descending movement of said delay dip mechanism and said carriage supported thereon to said lowered position.

References Cited by the Examiner

UNITED STATES PATENTS 3,116,821   1/1964   Davis _____ 214—89 X
3,152,705   10/1964  Lammert _____ 214—89

GERALD M. FORLENZA, *Primary Examiner.*

ALBERT J. MAKAY, *Examiner.*